US011683425B2

(12) United States Patent
Oga et al.

(10) Patent No.: US 11,683,425 B2
(45) Date of Patent: Jun. 20, 2023

(54) INFORMATION PROCESSING APPARATUS, IMAGE PROCESSING APPARATUS, AND METHOD OF CONTROLLING INFORMATION PROCESSING APPARATUS FOR CHANGING ACCOUNT INFORMATION OF A SERVICE

(71) Applicant: CANON KABUSHIKI KAISHA, Tokyo (JP)

(72) Inventors: Satohiro Oga, Chiba (JP); Hikaru Sugita, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/545,853

(22) Filed: Dec. 8, 2021

(65) Prior Publication Data

US 2022/0191338 A1  Jun. 16, 2022

(30) Foreign Application Priority Data

Dec. 15, 2020  (JP) .................. 2020-207362

(51) Int. Cl.
*H04N 1/00* (2006.01)
*H04N 1/44* (2006.01)

(52) U.S. Cl.
CPC ...... *H04N 1/00514* (2013.01); *H04N 1/00244* (2013.01); *H04N 1/00413* (2013.01); *H04N 1/4413* (2013.01); *H04N 2201/0094* (2013.01)

(58) Field of Classification Search
CPC .......... H04N 1/00514; H04N 1/00244; H04N 1/00413; H04N 1/4413; H04N 2201/0094
See application file for complete search history.

(56) References Cited

U.S. PATENT DOCUMENTS

2016/0094728 A1* 3/2016 Saito .................. H04N 1/00411
358/1.15

FOREIGN PATENT DOCUMENTS

JP  2008004705 A  1/2008
JP  2008047056 A  2/2008

* cited by examiner

*Primary Examiner* — Juan M Guillermety
(74) *Attorney, Agent, or Firm* — Canon U.S.A., Inc. IP Division

(57) ABSTRACT

An information processing apparatus including a first management unit configured to manage account information of a cloud service, and a second management unit configured to manage setting information on a function of a shortcut, includes a control unit configured to change, in a case where the account information is changed and a shortcut using the account information is present, the setting information of the shortcut.

14 Claims, 21 Drawing Sheets

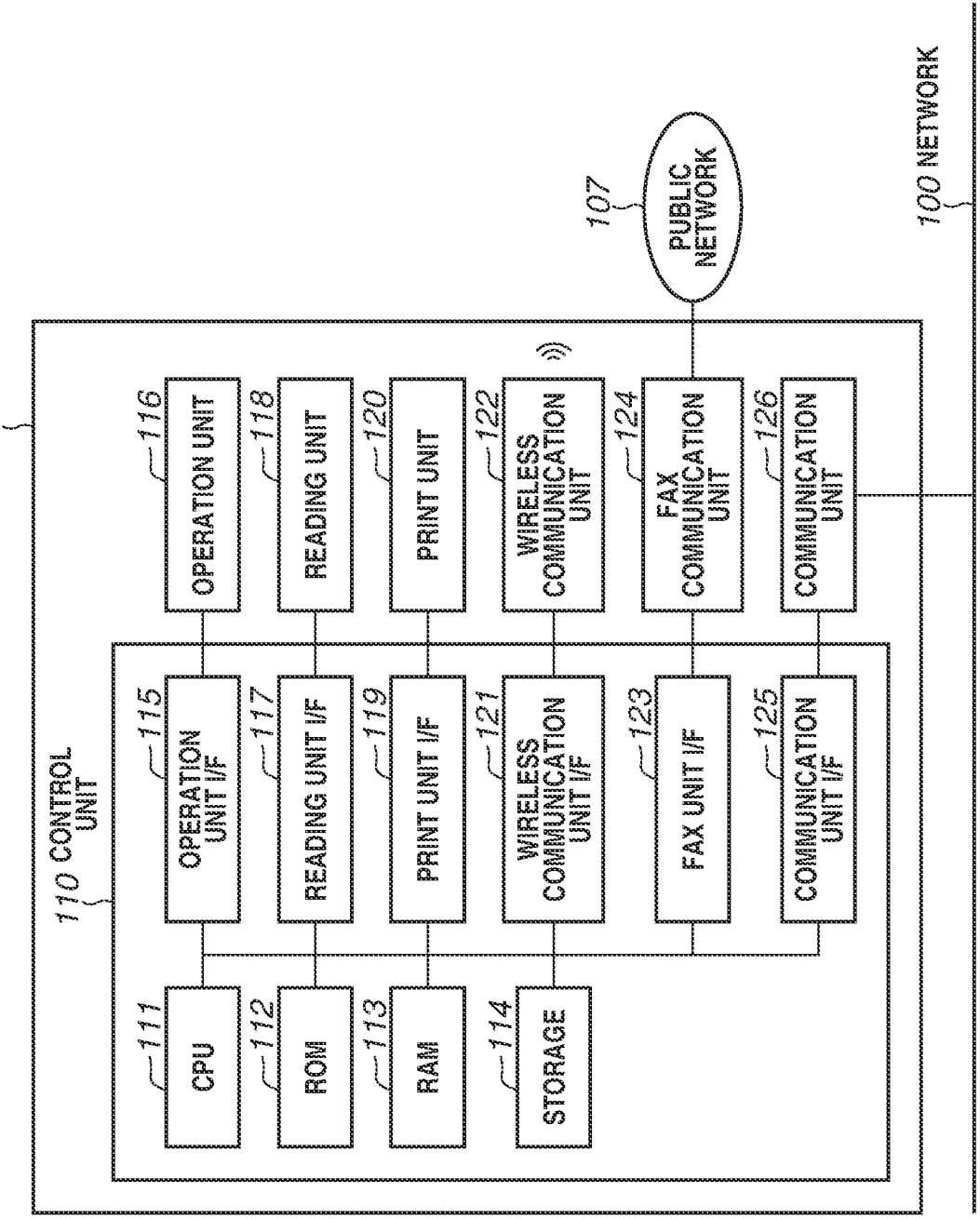

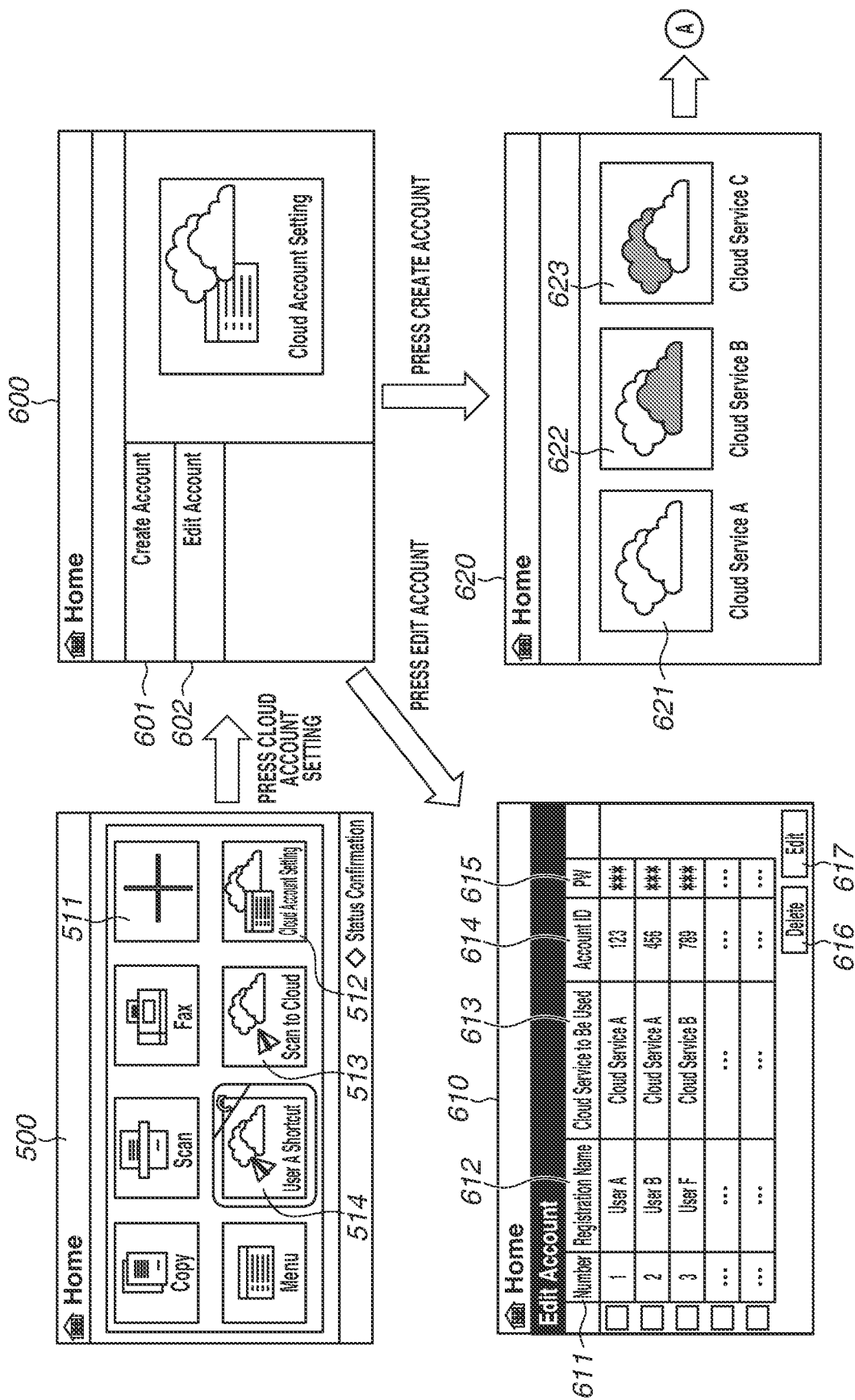

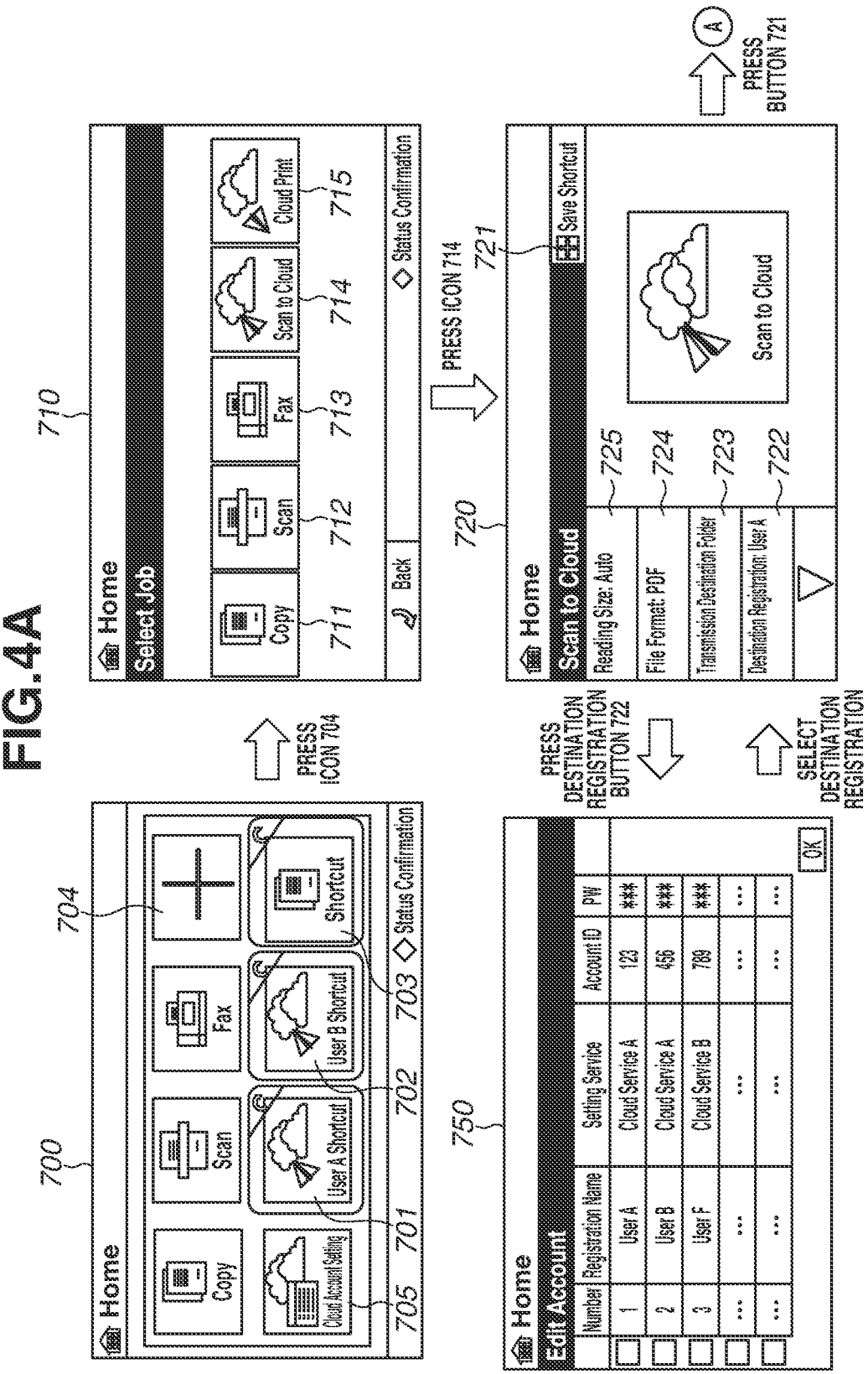

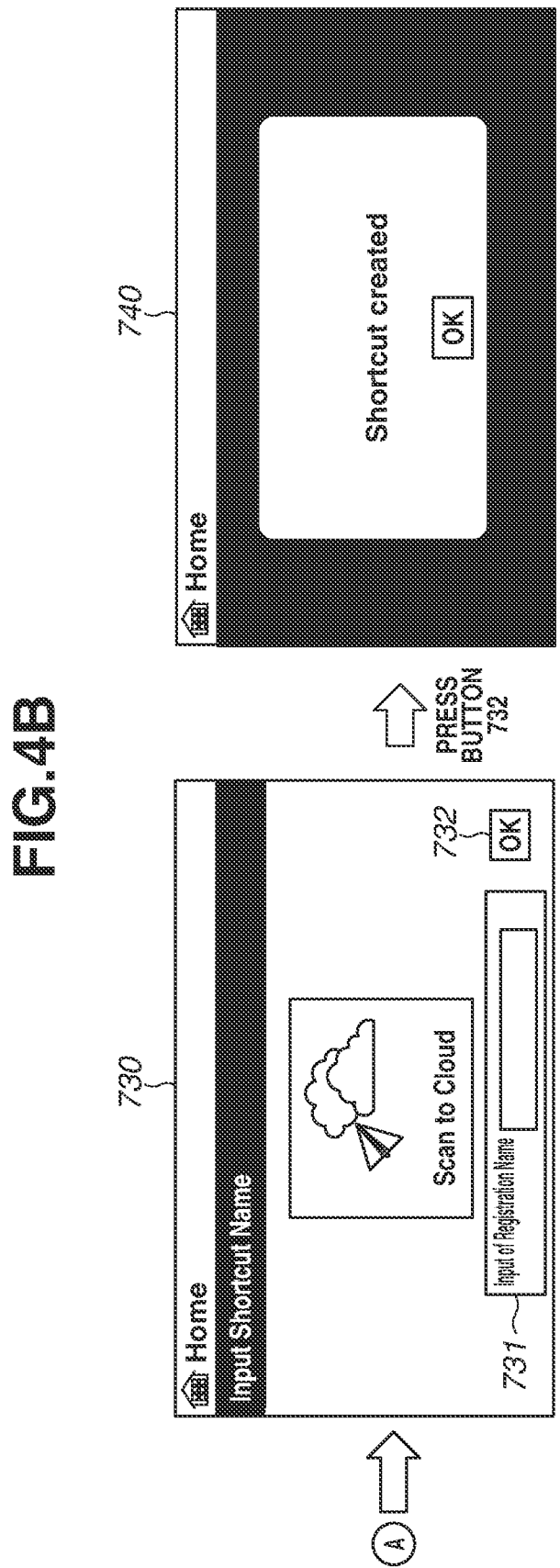

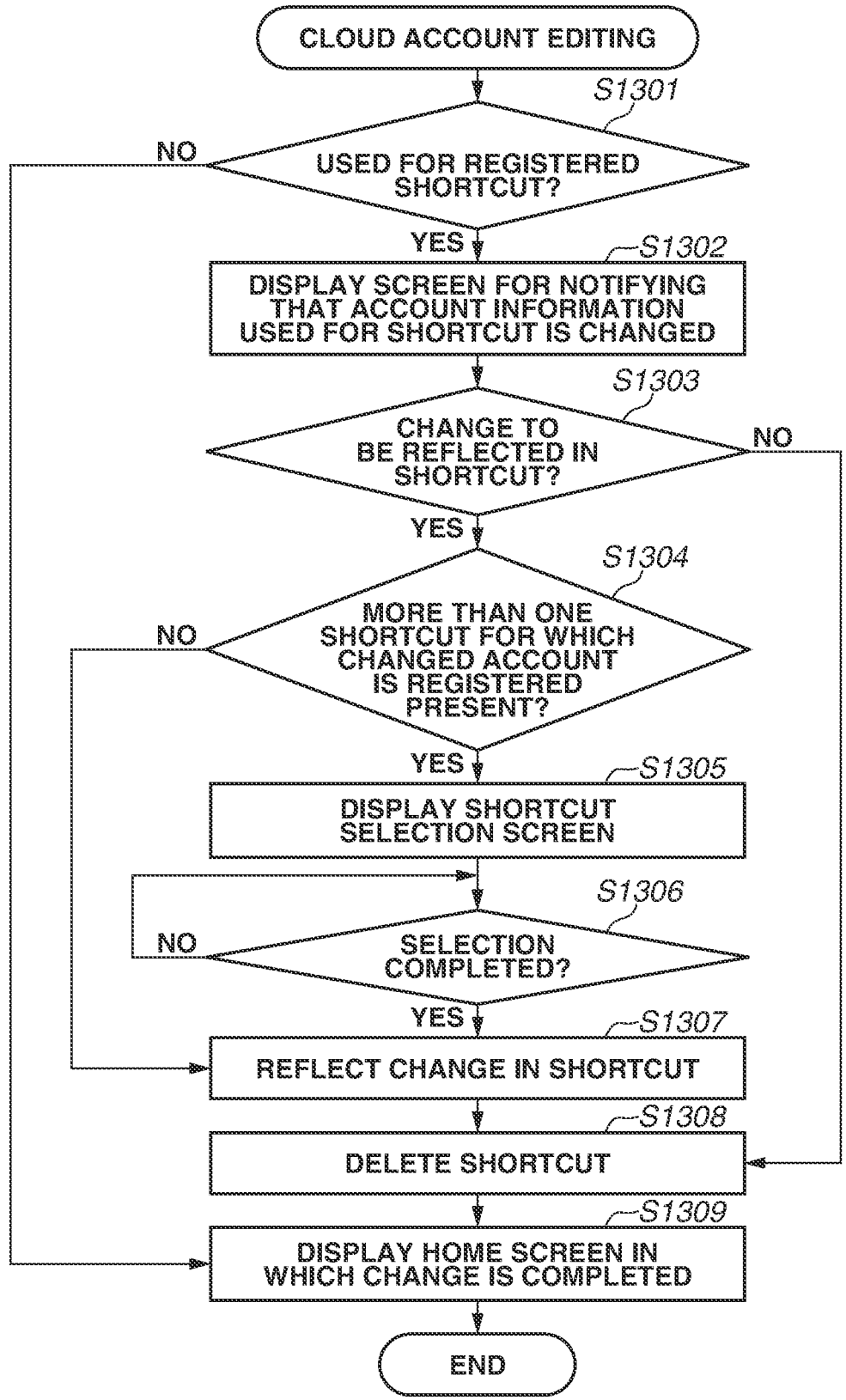

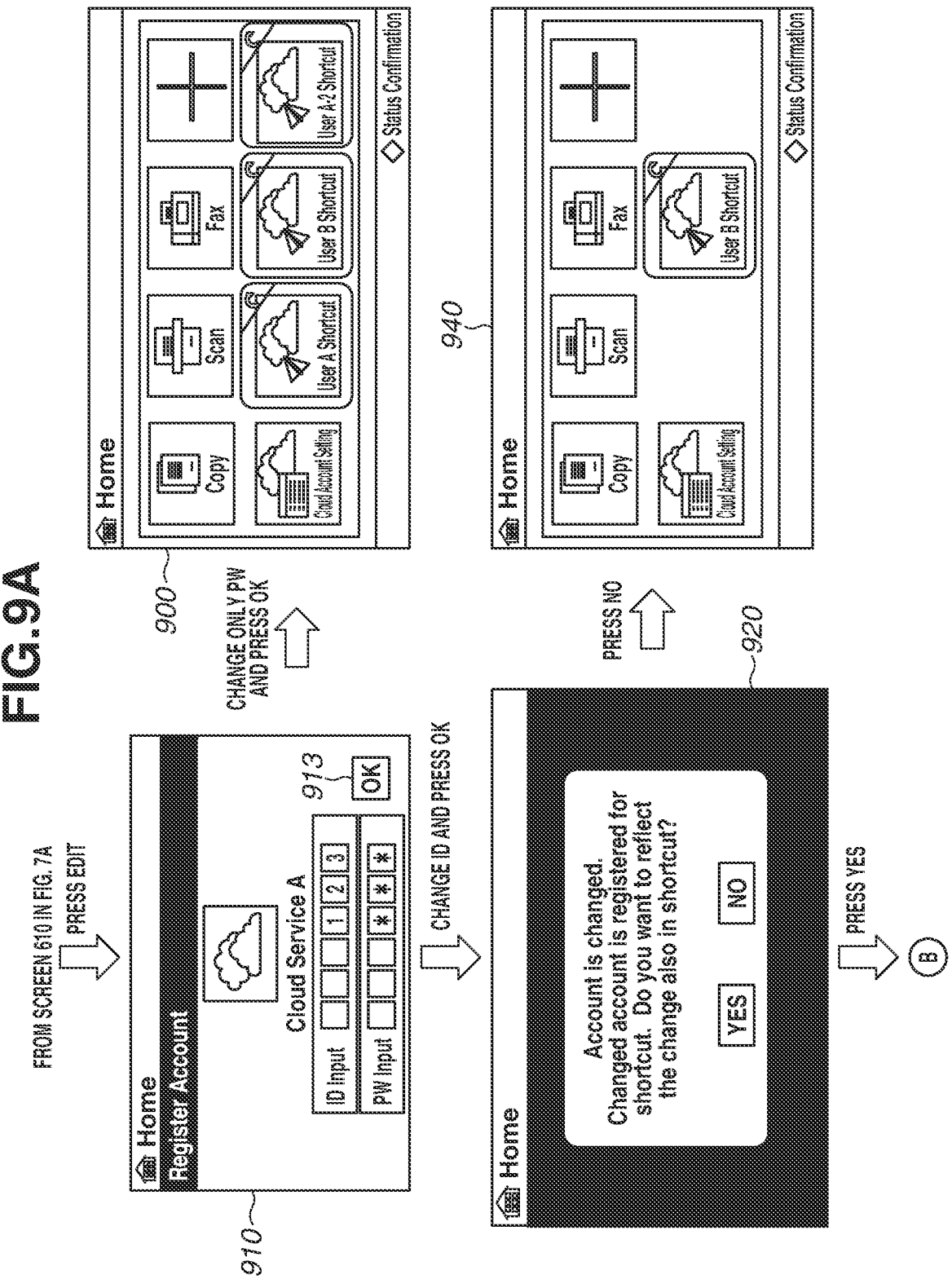

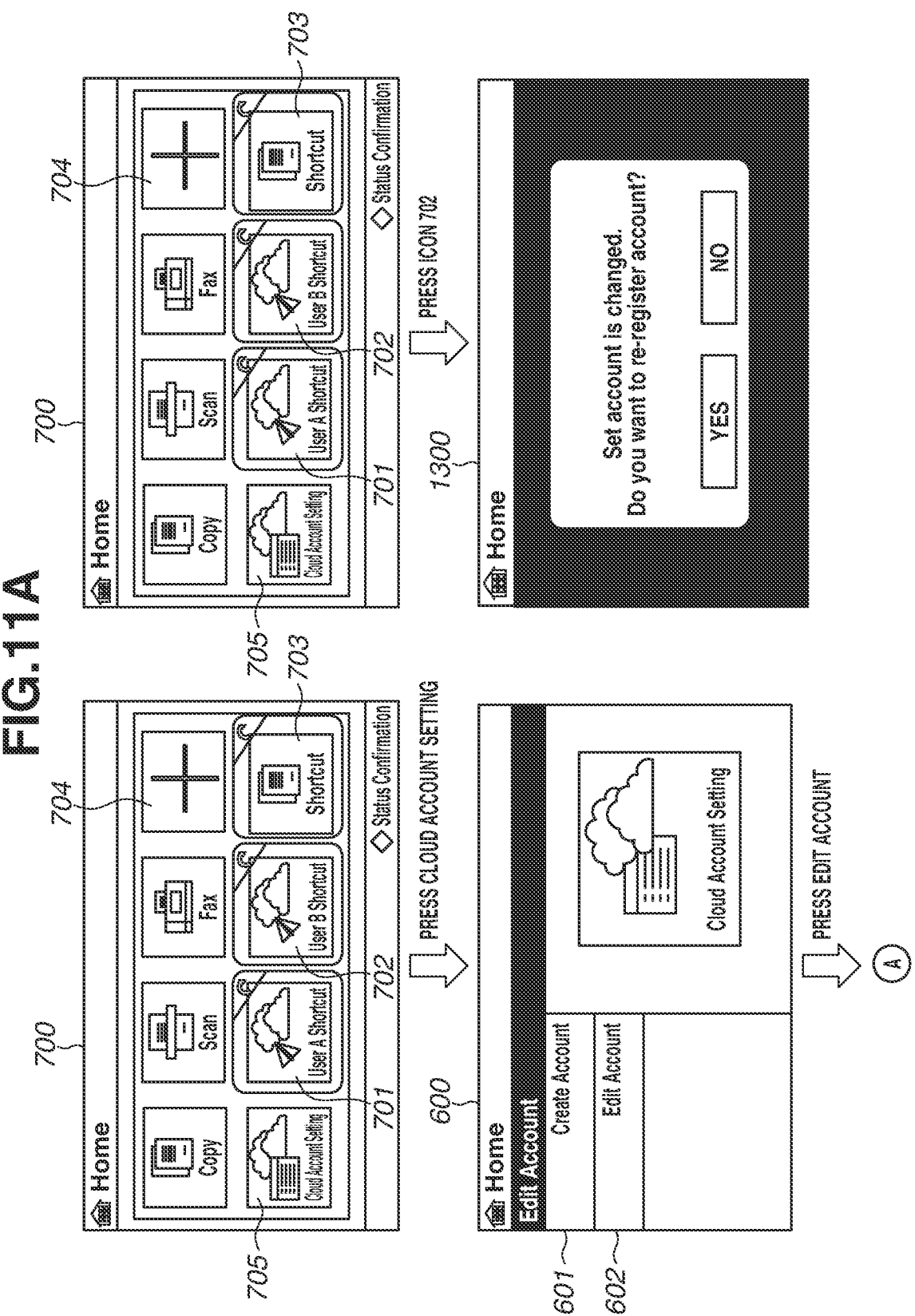

FIG.11B

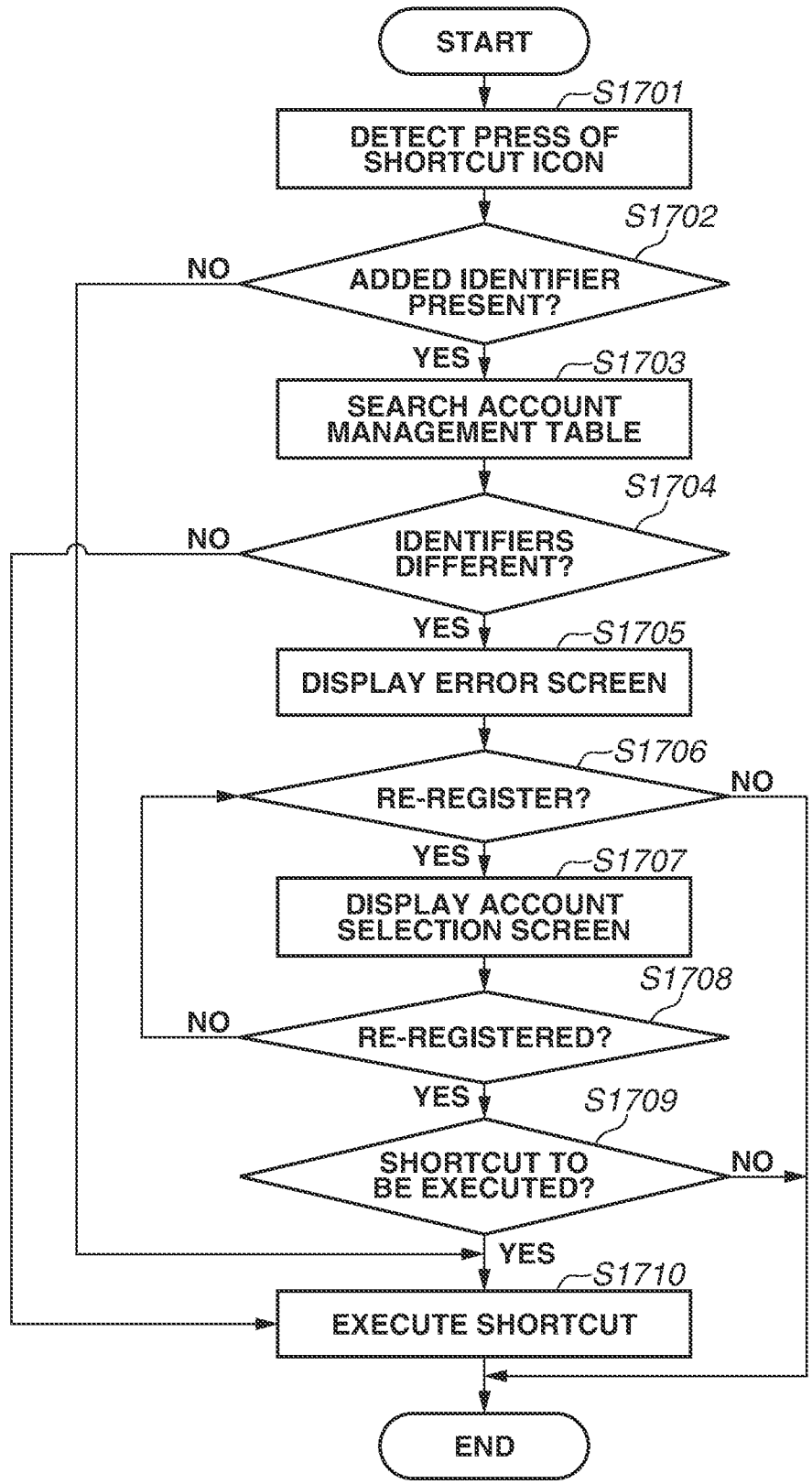

INFORMATION PROCESSING APPARATUS, IMAGE PROCESSING APPARATUS, AND METHOD OF CONTROLLING INFORMATION PROCESSING APPARATUS FOR CHANGING ACCOUNT INFORMATION OF A SERVICE

BACKGROUND

Field of the Disclosure

The present disclosure relates to an information processing apparatus, an image processing apparatus, and a method of controlling an information processing apparatus, for changing a setting of a shortcut of a cloud service.

Description of the Related Art

In recent years, a plurality of cloud services has appeared, and use of a cloud service has been a standard in proceeding with business. A multi-function peripheral (MFP) can perform interaction with a plurality of cloud services, and provides functions such as printing from a cloud service and transmission of an image to a cloud service. As discussed in Japanese Patent Application Laid-Open No. 2008-47056, as a method of interacting with a plurality of cloud services, there is known a method in which a plurality of pieces of cloud account information is registered and managed, and a shortcut button for a print function or a transmission function can be created by referring to cloud account information registered as a data acquisition source or a destination.

A plurality of cloud services and a plurality of pieces of account information are registered and managed as cloud account information in an MFP that is an information processing apparatus. The cloud account information can be edited and deleted by any user, and thus a change for use in a different cloud service can be made and account contents can be changed. Meanwhile, cloud account information needs to be registered in a case where a shortcut for an MFP function using a cloud service is created, and the cloud account information refers to and is associated with registered and managed account information. Thus, when a shortcut is executed, an account and information of a shortcut application are not synchronized. Even if the cloud account information is edited or deleted, edition or deletion thereof is not synchronized with the shortcut application, so that wrong transmission or a decrease in usability can occur.

SUMMARY

According to embodiments of the present disclosure, an information processing apparatus including a first management unit configured to manage account information of a cloud service, and a second management unit configured to manage setting information on a function of a shortcut, includes a control unit configured to change, in a case where the account information is changed and a shortcut using the account information is present, the setting information of the shortcut.

Further features of the present disclosure will become apparent from the following description of exemplary embodiments with reference to the attached drawings.

BRIEF DESCRIPTION OF THE DRAWINGS

FIGS. 1A and 1B illustrate an overall configuration of a system, and a configuration of a multi-function peripheral (MFP), respectively, according to an exemplary embodiment of the present disclosure.

FIG. 3A illustrates screens in account addition.

FIG. 4A illustrates screens in shortcut execution.

FIG. 4B illustrates screens in shortcut execution.

FIG. 8 illustrates a processing procedure for account change according to the first exemplary embodiment.

FIG. 9A illustrates screens in account change according to a second exemplary embodiment.

FIG. 11A illustrates screens in account deletion according to a third exemplary embodiment.

FIG. 11B illustrates screens in account deletion according to the third exemplary embodiment.

FIG. 15 illustrates a processing procedure after account change according to the fourth exemplary embodiment.

DESCRIPTION OF THE EMBODIMENTS

Figure 1A:
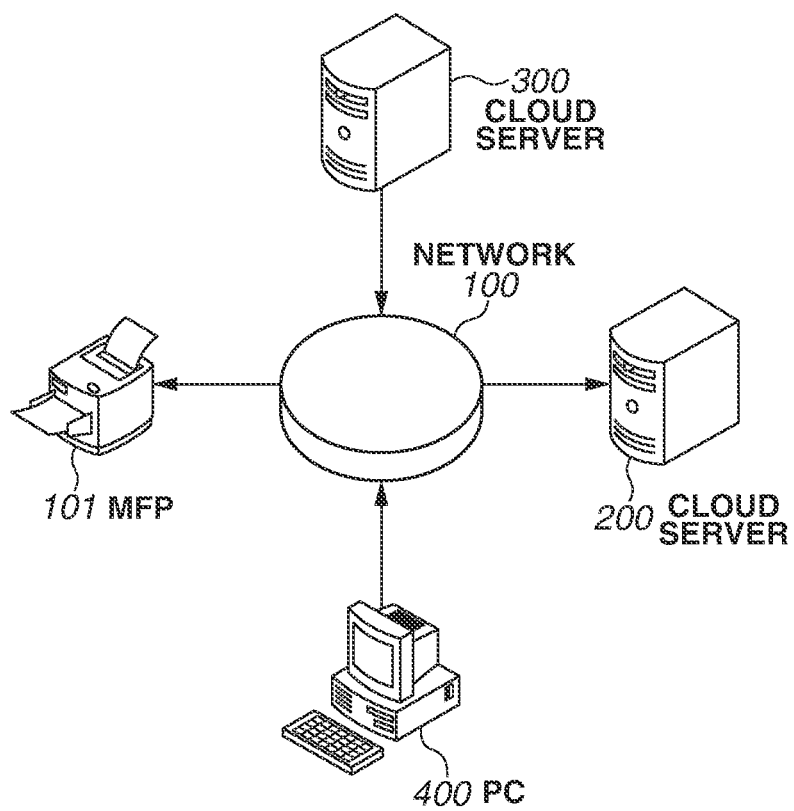

Exemplary embodiments of the present disclosure will be described below with reference to the drawings. Configurations in the following exemplary embodiments are only examples, and the present disclosure is not limited to the configurations illustrated in the drawings.

1. Overall Configuration of System

FIG. 1A is a diagram illustrating an example of a configuration of a system according to an exemplary embodiment of the present disclosure. The system according to the present exemplary embodiment includes cloud servers 200 and 300 that provide cloud services and can communicate with each other via a network 100, a multi-function peripheral (MFP) 101 serving as an image processing apparatus and also as an information processing apparatus, and a personal computer (PC) 400 serving as a terminal apparatus.

To use a cloud service, the MFP 101 confirms whether the cloud account registered in the MFP 101 is present in the cloud server 200. Then, the MFP 101 can store a scanned image in the cloud server 200, or can download an image stored in the cloud server 200 and print the downloaded image.

The MFP 101 can perform similar operation with the cloud server 300. For simplification, the cloud service provided by the cloud server 200 will be described below as an example.

2. Hardware Configuration of MFP

FIG. 1B is a diagram illustrating an example of a hardware configuration of the MFP 101. The MFP 101 includes a control unit 110, an operation unit 116, a reading unit 118, a print unit 120, a wireless communication unit 122, a fax communication unit 124, and a communication unit 126.

The control unit 110 includes a central processing unit (CPU) 111, a read only memory (ROM) 112, a random access memory (RAM) 113, a storage 114, an operation unit interface (I/F) 115, a reading unit I/F 117, a print unit I/F 119, a wireless communication unit I/F 121, a fax unit I/F 123, and a communication unit I/F 125. The control unit 110 including the CPU 111 controls operation of the entire MFP 101.

The CPU 111 loads a control program stored in the ROM 112 or the storage 114 into the RAM 113, and performs various types of control such as reading control and print control.

The ROM 112 stores a control program that can be executed by the CPU 111. The ROM 112 also stores a boot program, font data, and the like.

The RAM 113 is a main memory, and is used as a work area, and a temporary storage area for loading various control programs stored in the ROM 112 and the storage 114.

The storage 114 stores image data, print data, various programs, and various kinds of setting information. In the present exemplary embodiment, cloud setting information and account information are stored in the storage 114.

The operation unit I/F 115 connects the control unit 110 with the operation unit 116 including a display unit such as a touch panel and hardware keys. The operation unit 116 displays information to a user and detects an input from the user.

The reading unit I/F 117 connects the control unit 110 with the reading unit 118 such as a scanner. The reading unit 118 reads an image of a document, and the CPU 111 converts the image into image data such as binary data. The image data generated based on the image read by the reading unit 118 is transmitted to an external apparatus or printed on a recording sheet.

The print unit I/F 119 connects the control unit 110 with the print unit 120 such as a printer. The CPU 111 transfers image data (print data) stored in the RAM 113 to the print unit 120 via the print unit I/F 119. The print unit 120 prints an image based on the transferred image data on a recording sheet fed from a feeding cassette.

The wireless communication unit I/F 121 controls the wireless communication unit 122 connected thereto to wirelessly connect the control unit 110 with an external wireless device.

The fax unit I/F 123 controls the fax communication unit 124 to connect the control unit 110 to a public network 107. The fax unit I/F 123 is an interface for controlling the fax communication unit 124, and performs operation such as connection to a public network and control of a facsimile communication protocol by controlling a modem or a network control unit (NCU) for facsimile communication.

The communication unit I/F 125 connects the control unit 110 to the network 100. The communication unit I/F 125 controls the communication unit 126 to transmit image data and various kinds of information in the apparatus to an external apparatus on the network 100, and receive print data and information on the network 100 from an information processing apparatus on the network 100. As a method of performing transmission and reception via the network 100, the communication unit 126 can perform transmission and reception using e-mail, and file transmission using a protocol such as File Transfer Protocol (FTP), Server Message Block (SMB), or Web-based Distributed Authoring and Versioning (WebDAV). Further, the communication unit 126 transmits an image read by the reading unit I/F 117 to the cloud server 200, and downloads an image stored in the cloud server 200 and transfers the downloaded image to the print unit 120 via the print unit I/F 119.

The print unit 120 prints an image based on the transferred image data on a recording sheet fed from the feeding cassette.

3. Processing in MFP (Home Screen)

Figure 2:
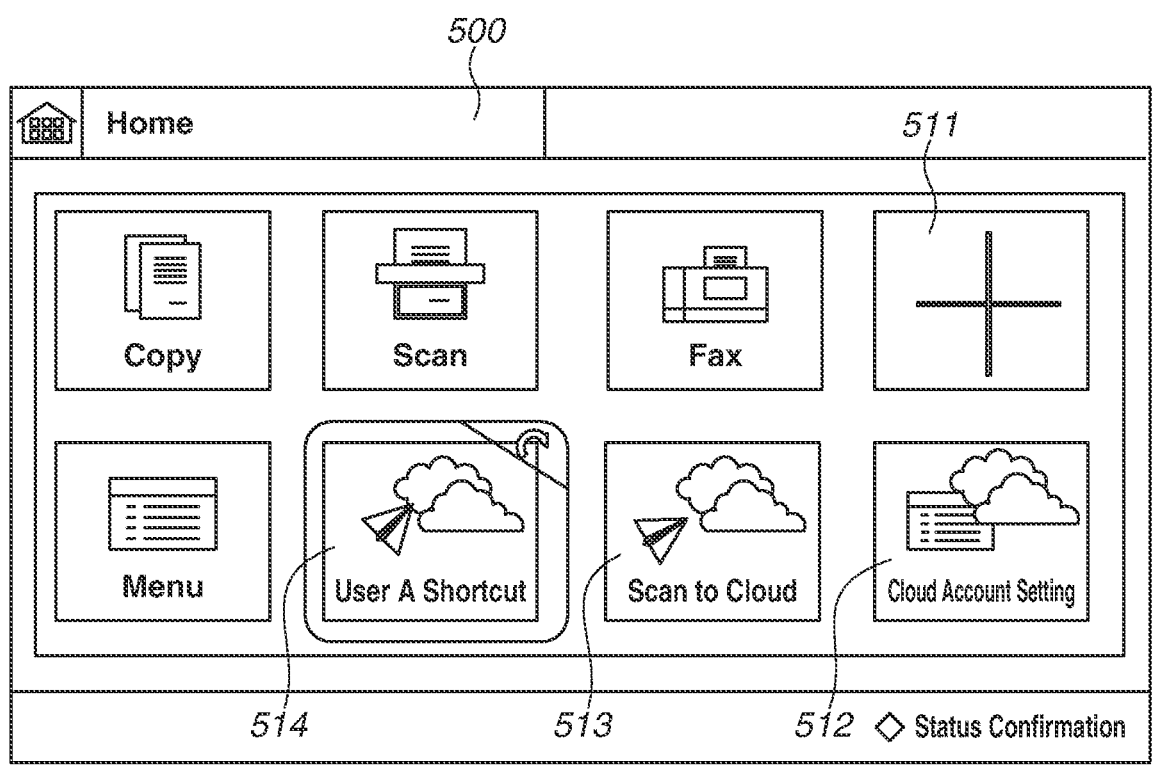
FIG. 2 illustrates a home screen of an operation unit.

FIG. 2 is a diagram illustrating an example of a home screen 500 of the operation unit 116 of the MFP 101 according to the present exemplary embodiment.

The operation unit 116 includes the display unit such as a touch panel and the hardware keys. The operation unit 116 displays information to the user and detects an input from the user. The screen 500 represents an example in which MFP functions are displayed on the touch panel.

An icon 511 represents an example of a function of creating a shortcut, and the screen 500 transitions to a shortcut creation screen at a press of the icon 511.

An icon 512 represents an example of a function of performing cloud account setting, and the screen 500 transitions to a screen for making settings such as registration of an account and editing of an account, at a press of the icon 512.

An icon 513 represents an example of an MFP cloud function, and the screen 500 transitions to a setting screen for cloud service execution, at the press of the icon 513.

An icon 514 represents an example of a shortcut icon, and an MFP function set beforehand by the user can be executed at a press of the icon 514, without being set again.

(3-1) Screen in Each Processing (3-1-1) Cloud Account Setting Processing

Figure 3B:
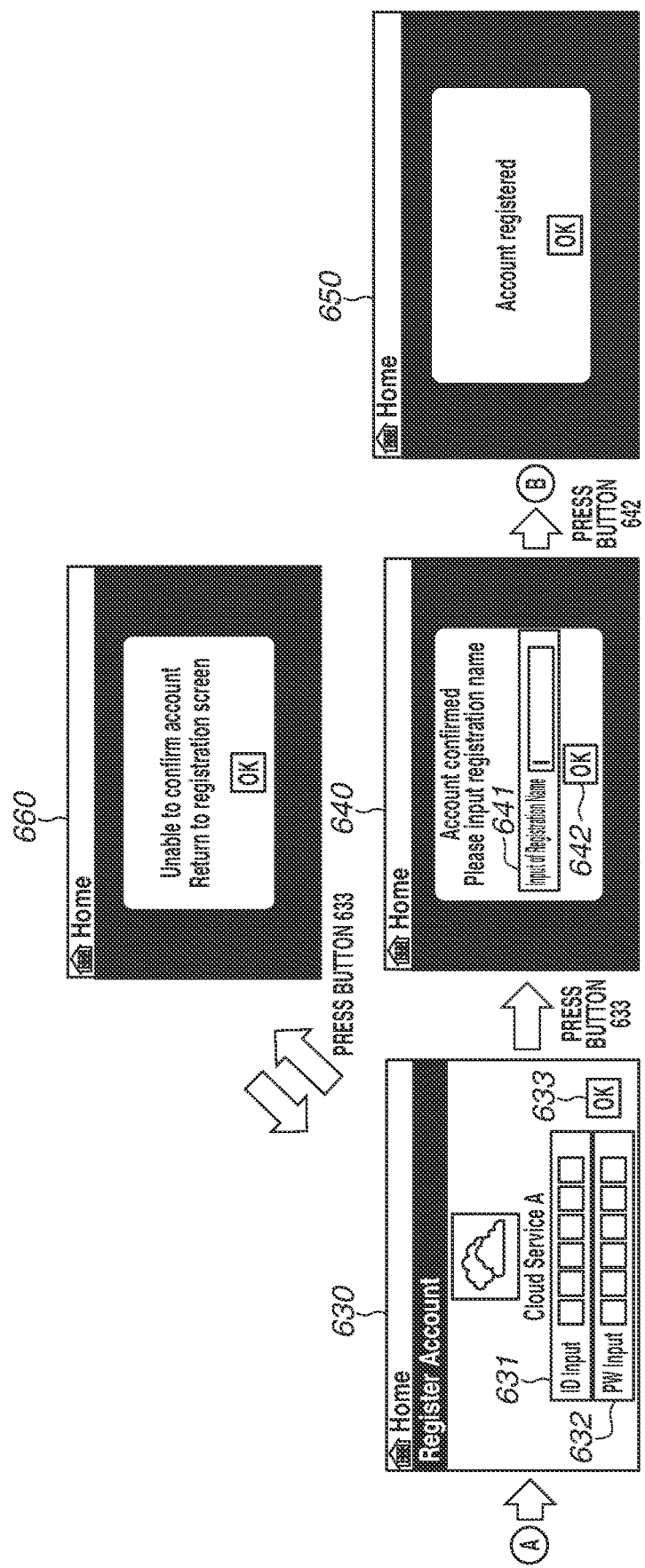
FIG. 3B illustrates screens in account addition.

FIGS. 3A and 3B illustrate an example of a screen transition in cloud account addition on the operation unit 116 of the MFP 101 according to the present exemplary embodiment. The home screen 500 transitions to a cloud account setting screen 600 at a press of the [Cloud Account Setting] icon 512 in the home screen 500.

In the cloud account setting screen 600, a [Create Account] button 601 and an [Edit Account] button 602 are displayed.

(Account Editing Screen)

When the [Edit Account] button 602 is pressed, the cloud account setting screen 600 transitions to a screen 610.

In the screen 610, a list of cloud accounts registered in the MFP 101 is displayed. The list of cloud accounts is managed using account management numbers in a column 611 (number). Each field in a column 612 (registration name), a column 613 (cloud service to be used), a column 614 (account identification (ID)), and a column 615 (password) is associated with the account management number. A record is selected by checking a checkbox at the top of the record. Subsequently, when a [Delete] button 616 is pressed, deletion of the selected record of the cloud account displayed in the screen 610 is executed. Similarly, when an [Edit] button 617 is pressed, editing is executed.

(Account Creation Screen)

When the [Create Account] button 601 in the screen 600 is pressed, the screen 600 transitions to a cloud service selection screen 620. The screen 620 represents an example of a screen for selecting a cloud service, and displays cloud services that can be connected from the MFP 101, as indicated by icons 621, 622, and 623.

When the [Cloud Service A] icon 621 is selected and pressed, the screen 620 transitions to a cloud account input screen 630. The user inputs an ID registered in the cloud service into an entry field 631 and a password into an entry field 632, and presses an [OK] button 633. Then, the control unit 110 confirms whether the account input for "cloud service A" is present. If the account is present, the screen 630 transitions to a registration name input screen 640. The user inputs a registration name to be registered in the MFP 101 into a registration name entry field 641, and presses an [OK] button 642, so that a registration completion screen 650 indicating completion of the cloud account registration in the MFP 101 appears. In a case where the [OK] button 633 in the screen 630 is pressed and the account input for "cloud service A" is not present, the screen 630 transitions to an input error screen 660.

(3-1-2) Shortcut Creation Processing

FIGS. 4A and 4B illustrate an example of a procedure for shortcut creation.

A home screen 700 is an example of a screen including shortcut icons.

Shortcut icons 701, 702, and 703 each represent an icon already set as a shortcut, and when any of the shortcut icons is pressed by the user, the corresponding MFP function can be executed without being set again. Further, when a [Create Shortcut] icon 704 is pressed, a shortcut creation procedure is executed, and the screen 700 transitions to a screen 710.

The screen 710 displays a list of MFP functions for each of which a shortcut can be created, and when any of icons 711 to 715 is selected and pressed, the screen 710 transitions to a details setting screen 720. Here, a case is cited where the icon 714 is pressed.

In the screen 720, details of the MFP function can be set by buttons 724 and 725, and when a [Destination Registration] button 722 is pressed, the screen 720 transitions to a screen 750. Here, a case is cited where the button 722 is pressed.

In the screen 750, a destination is set by selecting a checkbox at the top of a record of a cloud account registered in the MFP 101, editing a transmission destination, and pressing an [OK] button. Then, the screen 720 appears again.

When a button 723 is pressed in the screen 720, the screen 720 transitions to a screen (not illustrated) for designating a folder in the cloud server set as the transmission destination, so that a transmission destination folder can be designated.

When a button 721 is pressed in the screen 720, the setting of the shortcut selected in the screen 710 is temporarily saved, and the screen 720 transitions to a screen 730.

In the screen 730, a registration name to be displayed for the shortcut on the MFP 101 is input into a registration name entry field 731 by the user, and an [OK] button 732 is pressed, so that a shortcut having the input registration name is created. Then, the screen 730 transitions to a screen 740.

When an [OK] button is pressed in the screen 740, the processing ends, and the home screen 700 appears again.

(Shortcut Management Table)

Next, a method of managing the created shortcut in the MFP 101 will be described.

Figure 5:
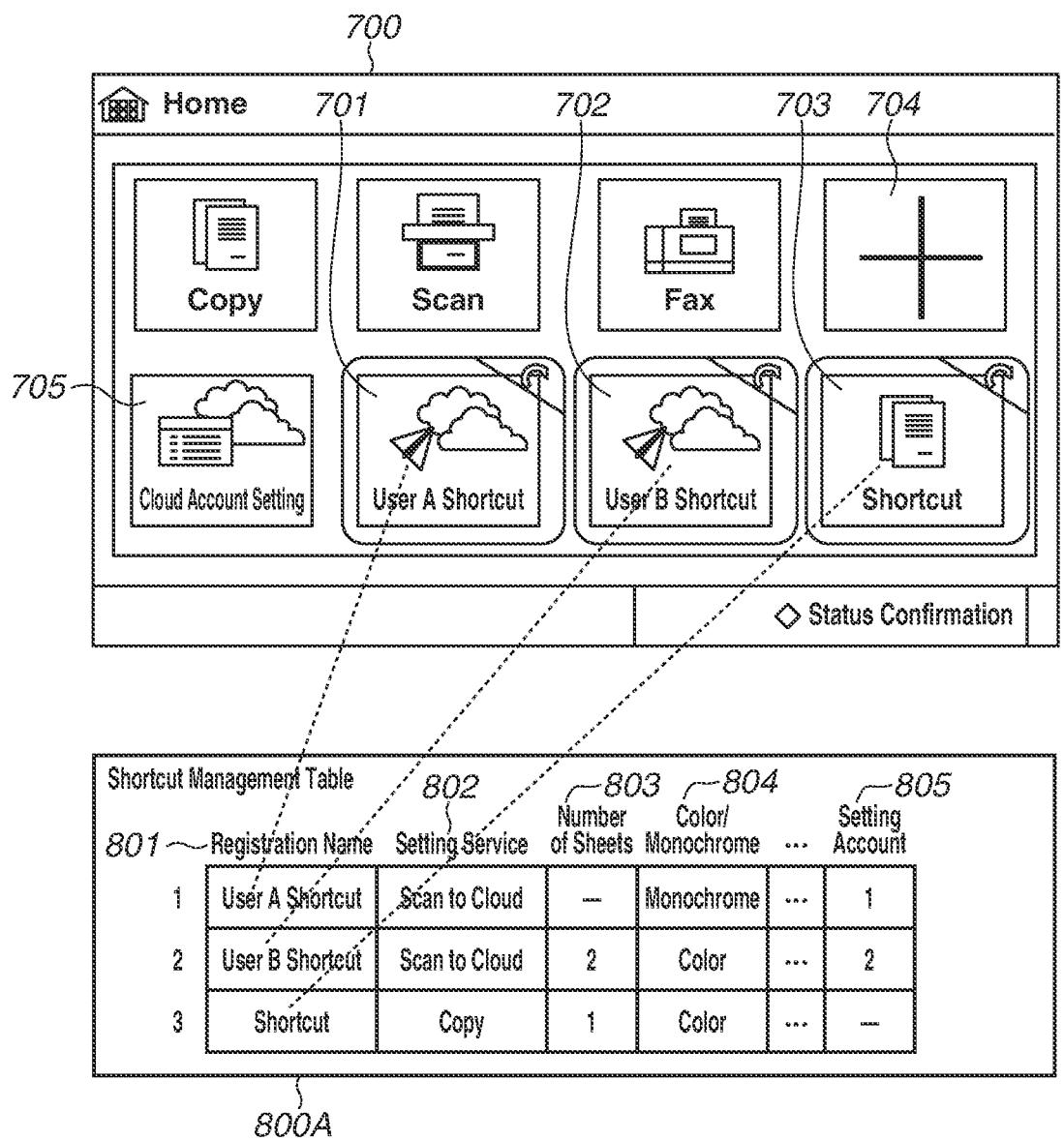
FIG. 5 illustrates a shortcut management table.

FIG. 5 illustrates a correspondence relationship between the home screen 700 and a shortcut management table 800A managed in the MFP 101.

In the shortcut management table 800A, each record has fields corresponding to respective columns to be described below, and the fields are managed in association with each other. The columns are a column 801 (registration name), a column 802 (setting service: setting function), a column 803 (the number of sheets), a column 804 (color/monochrome), and a column 805 (setting account: cloud account registration number). The cloud account registration number in the column 805 is the number of a record to be referred to from the list of cloud accounts (the screen 750) when the shortcut of the cloud function is executed.

Figure 6A:
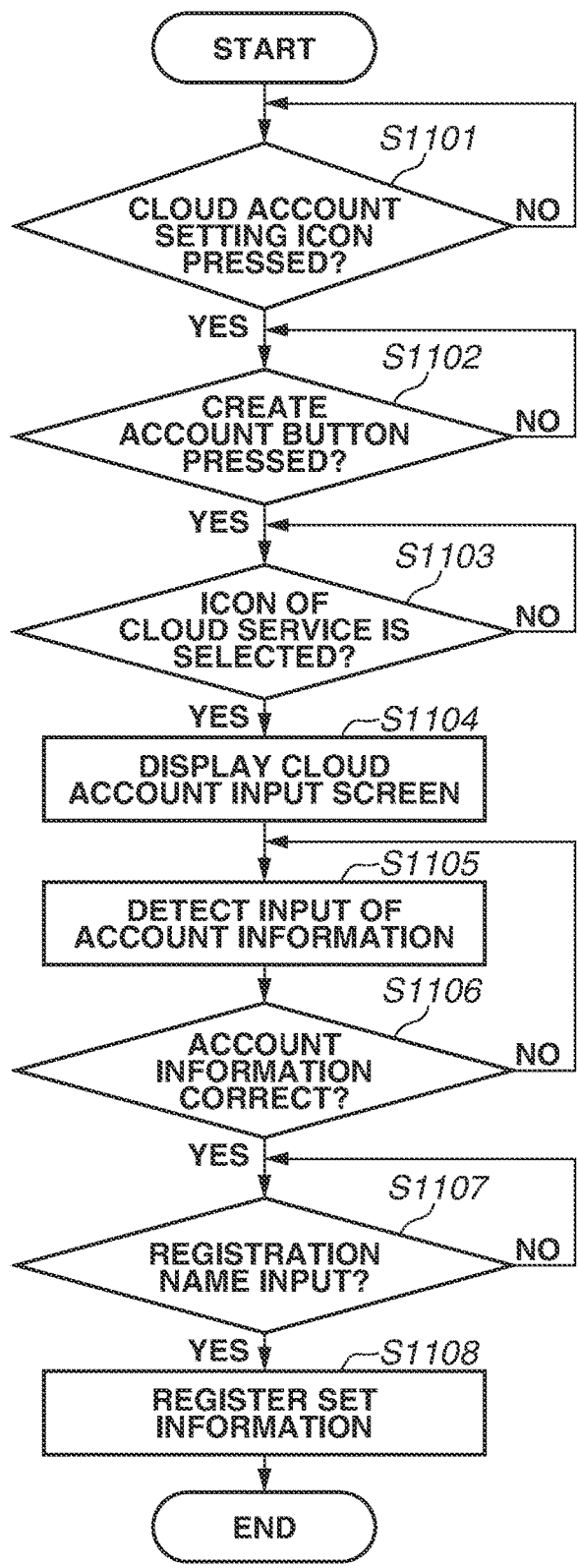
FIGS. 6A and 6B illustrate a typical processing procedure for account registration and a typical processing procedure for shortcut creation, respectively.

(3-2) Procedure for Each Processing (3-2-1) Account Registration Processing for Cloud Service FIG. 6A illustrates a procedure for account registration processing for using the cloud service. The details will be described below with reference to the screens illustrated in FIGS. 3A and 3B. First, the procedure starts from a state where the home screen 500 is displayed on the operation unit 116.

In step S1101, the CPU 111 determines whether the [Cloud Account Setting] icon 512 in the screen 500 displayed on the operation unit 116 is pressed by the user. If the icon 512 is pressed (YES in step S1101), the CPU 111 instructs the operation unit 116 to display the cloud account setting screen 600, and the processing proceeds to step S1102.

In step S1102, the CPU 111 determines whether the [Create Account] button 601 in the cloud account setting screen 600 is pressed, via the operation unit 116. If the button 601 is pressed (YES in step S1102), the CPU 111 instructs the operation unit 116 to display the cloud service selection screen 620, and the processing proceeds to step S1103.

In step S1103, the CPU 111 determines whether any of the icons 621 to 623 of the cloud services displayed in the cloud service selection screen 620 is selected, via the operation unit 116. If the icon is selected (YES in step S1103), the CPU 111 instructs the operation unit 116 to display the cloud account input screen 630, and the processing proceeds to step S1104.

In step S1104, the CPU 111 displays the cloud account input screen 630 on the operation unit 116 to prompt the user to register an account for the cloud service.

In step S1105, the CPU 111 detects the input of account information via the operation unit 116. Specifically, the CPU 111 detects the input of an ID into the entry field 631 and a password into the entry field 632, and a press of the [OK] button 633, in the cloud account input screen 630.

In step S1106, the CPU 111 connects to the cloud server 200 via the communication unit 126, and determines whether the account information is correct. If the account information is correct (YES in step S1106), the CPU 111 instructs the operation unit 116 to transition to the registration name input screen 640, and the processing proceeds to step S1107. If the account information is not correct (NO in step S1106), the CPU 111 displays the input error screen 660 on the operation unit 116, and the processing returns to step S1105.

In step S1107, the CPU 111 determines whether a registration name is input into the registration name entry field 641 and the [OK] button 642 is pressed in the registration name input screen 640, via the operation unit 116. If the registration name is input and the [OK] button 642 is pressed (YES in step S1107), the processing proceeds to step S1108.

In step S1108, the CPU 111 causes the operation unit 116 to transition to the registration completion screen 650, and the set information is registered in the MFP 101.

This completes the creation of the account, and the created account can be selected and used when the cloud service is used.

(3-2-2) Shortcut Creation Processing

Figure 6B:
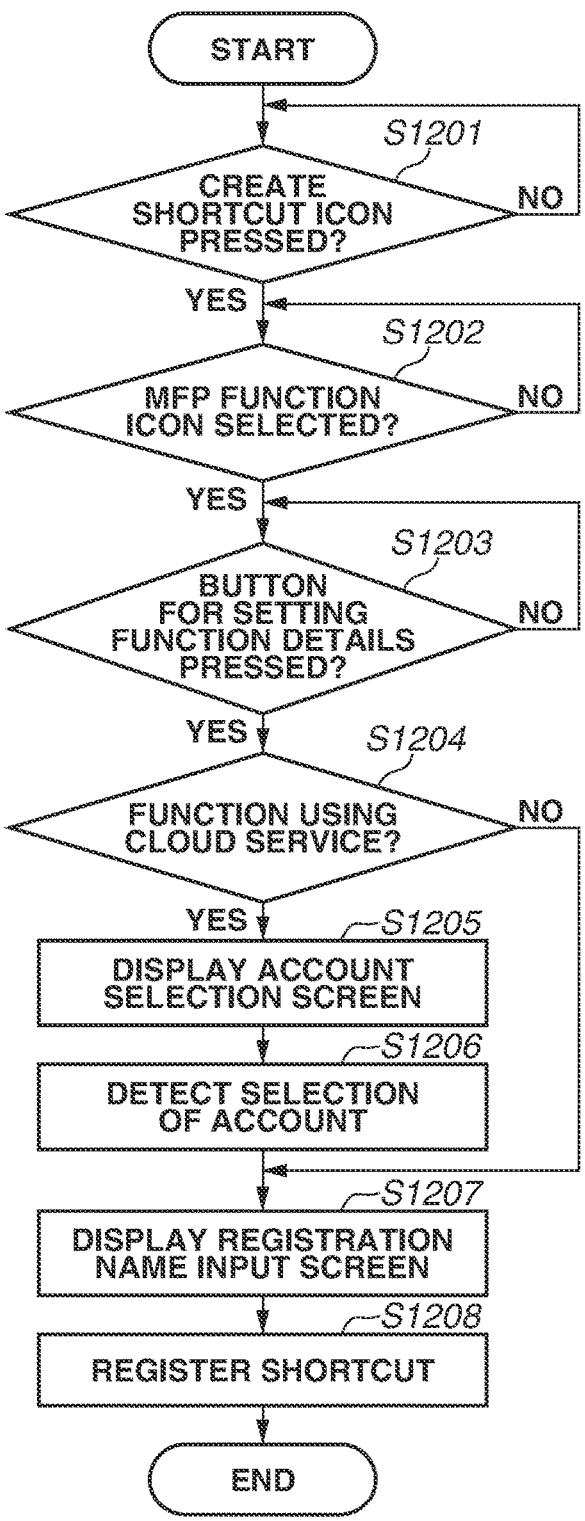

FIG. 6B illustrates an example of a procedure for shortcut creation. Details will be described below with reference to the screens illustrated in FIGS. 4A and 4B. First, the procedure starts from a state where the home screen 700 is displayed on the operation unit 116.

In step S1201, the CPU 111 determines whether the [Create Shortcut] icon 704 is pressed via the operation unit 116. If the icon 704 is pressed (YES in step S1201), the screen 700 transitions to the screen 710 (a shortcut function selection screen).

In step S1202, the CPU 111 displays the list of MFP functions for creating a shortcut in the shortcut function selection screen 710 via the operation unit 116, and determines whether the icon (any of the icons 711 to 715) of the MFP function is selected. If the icon (e.g., the icon 714) is selected (YES in step S1202), the processing proceeds to step S1203 to transition to the details setting screen 720. The description will be provided below based on a case where the icon 714 is pressed.

In step S1203, the CPU 111 determines whether any of the buttons 722 to 725 for setting the details of the MFP function is pressed in the details setting screen 720, via the operation unit 116. If the button is pressed (YES in step S1203), the CPU 111 executes processing for setting the details, and the processing proceeds to step S1204.

In step S1204, the CPU 111 determines whether the MFP function selected in the shortcut function selection screen 710 is a function using the cloud service, via the operation unit 116. If the MFP function is a function not using the cloud service (NO in step S1204), the processing proceeds to step S1207. If the CPU 111 determines that the MFP function is a function using the cloud service (YES in step S1204), the processing proceeds to step S1205. The case where the cloud service is not used is a case where any of the icons 711, 712, and 713 is selected in the shortcut function selection screen 710. The case where the cloud service is used is a case where either the icon 714 or 715 is selected in the shortcut function selection screen 710.

In step S1205, the CPU 111 detects a press of the [Destination Registration] button 722 in the details setting screen 720, via the operation unit 116. Subsequently, the CPU 111 displays the screen 750 (an account selection screen) to prompt the user to select a cloud service account registered in the MFP 101.

In step S1206, the CPU 111 detects selection of the account in the account selection screen 750 via the operation unit 116, and the screen 750 transitions to the details setting screen 720.

In step S1207, the CPU 111 detects a press of the button 721 (a [Save Shortcut] button)) in the details setting screen 720 via the operation unit 116, and the screen 720 transitions to the screen 730 (a registration name input screen).

In step S1208, the CPU 111 detects the input of the registration name of the shortcut into the registration name entry field 731 and a press of the [OK] button 732 in the registration name input screen 730, via the operation unit 116. Then, the CPU 111 displays the screen 740 (a shortcut creation completion screen), and performs processing for registering the shortcut in the MFP 101. When the [OK] button is pressed, the processing ends, and the home screen 700 appears again.

This completes the creation of the shortcut. A press of the created shortcut icon makes it possible to execute the MFP function without setting the MFP function.

(3-3) Screen in Account Change Processing

Figure 7A:
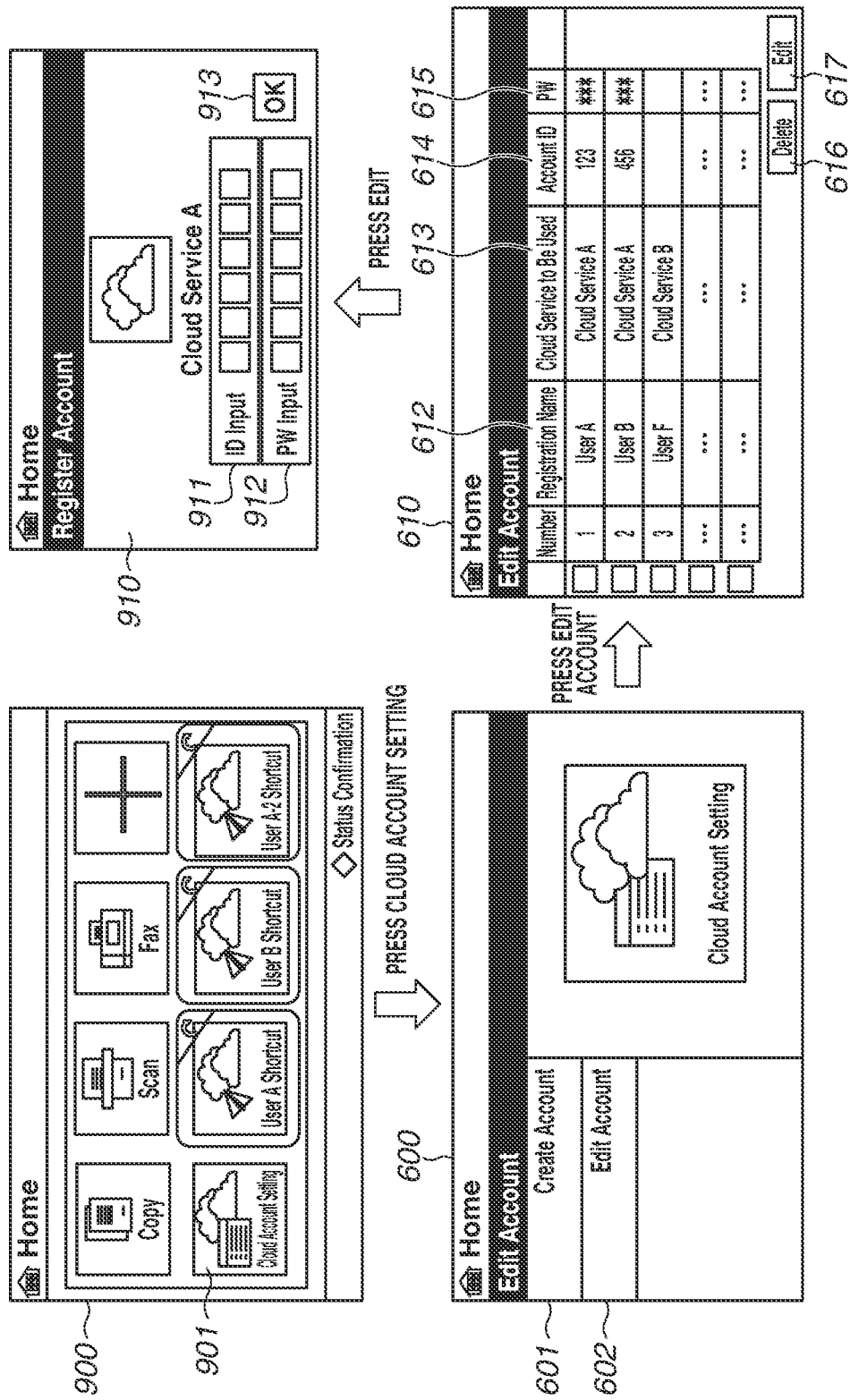
FIG. 7A illustrates screens in account change according to a first exemplary embodiment.
Figure 7B:
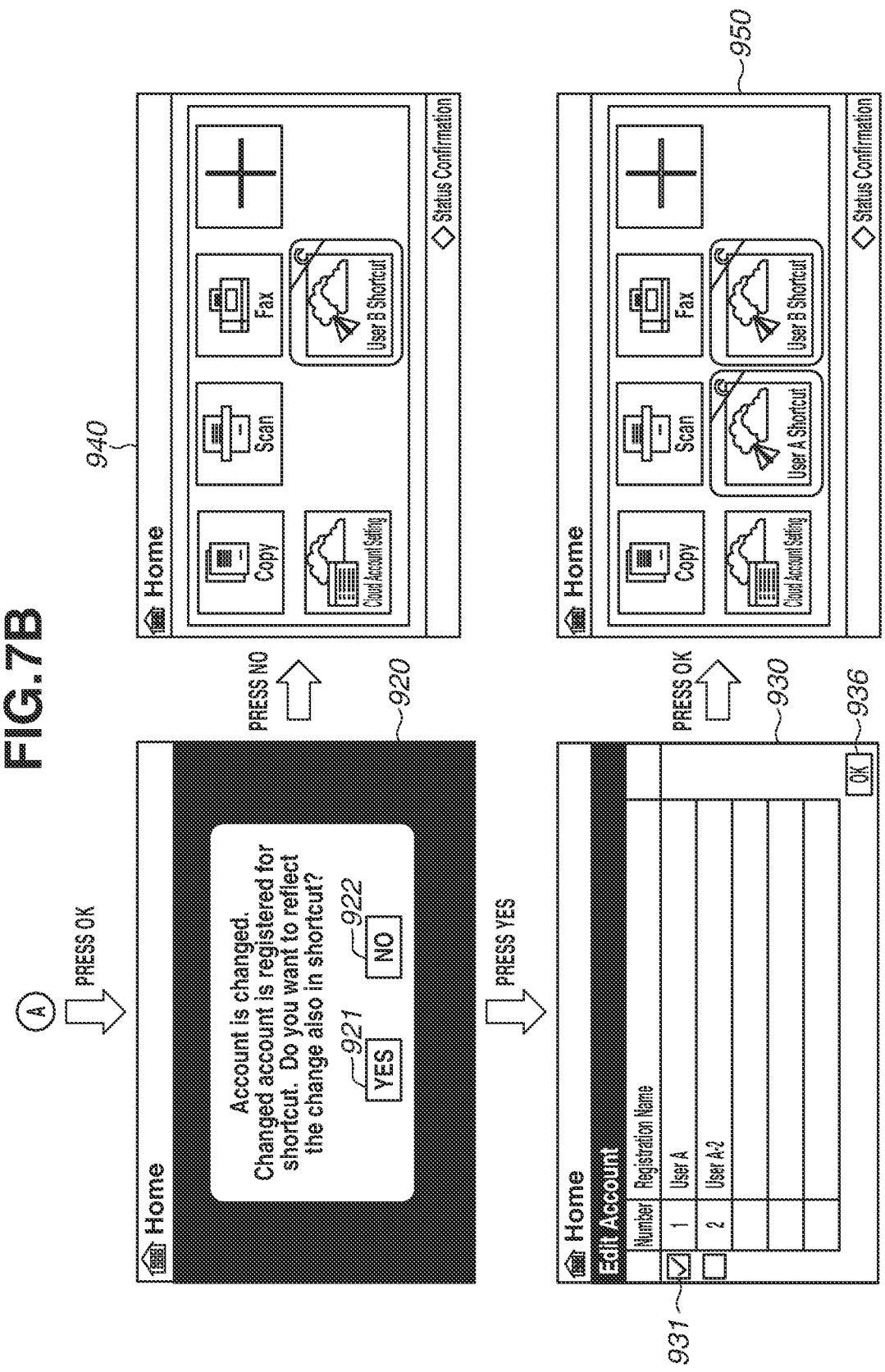
FIG. 7B illustrates screens in account change according to the first exemplary embodiment.

FIGS. 7A and 7B illustrate an example of a screen transition in account change according to a first exemplary embodiment.

When a [Cloud Account Setting] icon 901 is pressed in a home screen 900, the screen 900 transitions to the cloud account setting screen 600.

When the [Edit Account] button 602 is pressed in the cloud account setting screen 600, the screen 600 transitions to the screen 610 (an account editing screen).

When an account to be edited is selected by checking a checkbox at the top of each record in the account editing screen 610 and the [Edit] button 617 is pressed, the screen 610 transitions to an account change screen 910.

In the account change screen 910, a screen in a state where the current account information is input appears, and an ID and a PW can be changed. When an ID entry field 911 and a PW entry field 912 are edited and an [OK] button 913 is pressed, a shortcut reflection pop-up screen 920 appears. When a [YES] button 921 is pressed, a shortcut selection screen 930 appears. When a [NO] button 922 is pressed, a home screen 940, in which the shortcut icon for which the changed account is registered is deleted, appears.

In the shortcut selection screen 930, a list of shortcuts for which the changed account is registered is displayed. A checkbox is displayed at the top of each record so that a shortcut for reflecting the account change can be selected. When an [OK] button 936 is pressed after the shortcut for reflecting the account change is selected by checking the checkbox, the account of the selected shortcut is changed. In addition, a home screen 950 in which a shortcut icon not selected is deleted appears.

(3-4) Procedure of Account Change Processing

FIG. 8 illustrates an example of a procedure for cloud account change of the MFP 101 according to the present exemplary embodiment. The procedure will be described below with reference to the screens in FIGS. 7A and 7B. The CPU 111 loads a control program stored in the ROM 112 or the storage 114 into the RAM 113, so that each operation (step) of the MFP 101 in the flowchart of the present exemplary embodiment is executed.

First, the processing procedure starts from a state where the account ID and the password of the selected cloud service are edited and the [OK] button 913 is pressed in the screen 910 in FIG. 7A.

In step S1301, the CPU 111 determines whether the changed account of the cloud service is used for the registered shortcut. If the CPU 111 determines that the changed account is used (YES in step S1301), the processing proceeds to step S1302. If the CPU 111 determines that the changed account is not used (NO in step S1301), the processing proceeds to step S1309.

In step S1302, the CPU 111 displays the shortcut reflection pop-up screen 920 via the operation unit 116, and notifies that the account information used for the shortcut is changed.

In step S1303, the CPU 111 determines whether to reflect the change in the shortcut by confirming whether the [YES] button 921 is pressed in the shortcut reflection pop-up screen 920. If the CPU 111 determines to reflect the change (YES in step S1303), the processing proceeds to step S1304. If the CPU 111 determines not to reflect the change (NO in step S1303), the processing proceeds to step S1308.

In step S1304, the CPU 111 determines whether more than one shortcut for which the changed account is registered is present. If the CPU 111 determines that more than one shortcut is present (YES in step S1304), the processing proceeds to step S1305. If only one shortcut is present (NO in step S1304), the processing proceeds to step S1307.

In step S1305, the CPU 111 displays the shortcut selection screen 930 via the operation unit 116.

In step S1306, the CPU 111 determines whether the [OK] button 936 is pressed after the shortcut is selected by checking a checkbox 931 in the shortcut selection screen 930, via the operation unit 116. If the CPU 111 determines that the [OK] button 936 is pressed (YES in step S1306), the processing proceeds to step S1307.

In step S1307, the CPU 111 reflects the account change in the selected shortcut.

Subsequently, in step S1308, a shortcut for which the account is not selected in step S1306, i.e., for which the account is not changed, and a shortcut for which the change is not to be reflected (No in step S1303) and the account is used, are deleted.

In step S1309, the CPU 111 displays the home screen 950 in which the change is completed, and the processing ends.

As described above, in the present exemplary embodiment, the notification to the user and the setting reflection are performed by displaying the pop-up screen during the setting change, so that wrong transmission in the shortcut execution can be prevented.

In the first exemplary embodiment, when the setting of the account information of the cloud service is changed, the pop-up screen for notifying the setting reflection in the shortcut related to the account is displayed, so that wrong transmission in the shortcut execution is prevented by the setting reflection.

In a second exemplary embodiment, in a case where the setting of the account information of the cloud service is changed, a pop-up screen is displayed to prompt the user to change a setting necessary for executing the shortcut, during shortcut setting change accompanying the change of the account information. Specifically, there will be described an example in which, in a case where a function (Scan to Cloud) registered to a shortcut transmits scan data to a cloud, a screen for changing a transmission destination folder is displayed, so that wrong transmission is prevented.

(3-5) Screen in Account Change

Figure 9B:
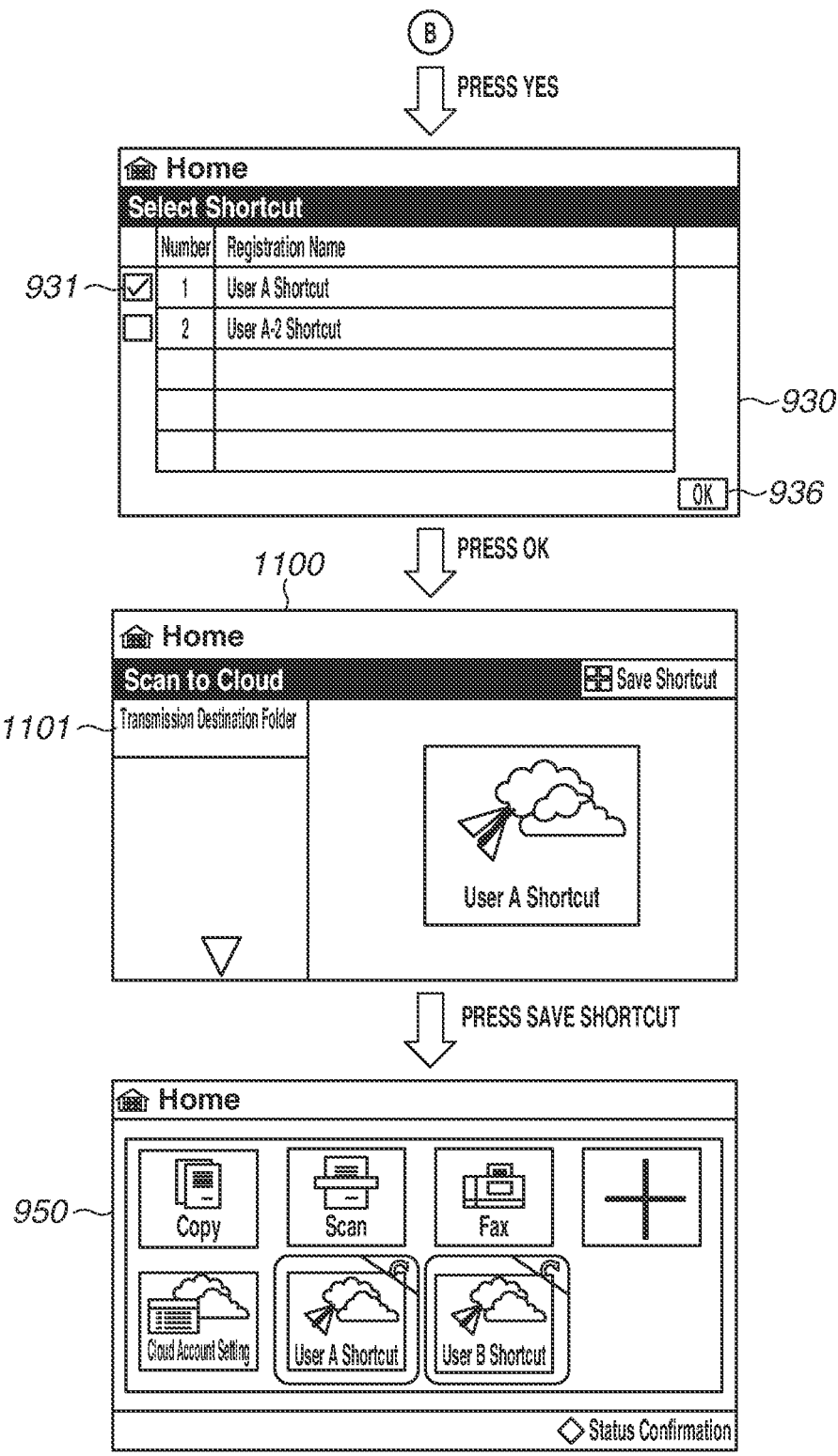
FIG. 9B illustrates screens in account change according to the second exemplary embodiment.

FIGS. 9A and 9B illustrate an example of a screen transition in account change according to the second exemplary embodiment.

The description of screens similar to those in the first exemplary embodiment will be omitted, and screens 910, 930, and 1100 will be mainly described.

The following screen transition starts from a state where the screen 910 is displayed by a press of the [Edit] button 617 in the screen 610 in FIG. 7A.

If only the password is changed and the [OK] button 913 is pressed in the account change screen 910, the screen 910 transitions to the home screen 900.

On the other hand, if the ID is changed and the [OK] button 913 is pressed in the account change screen 910, the screen 910 transitions to the pop-up screen 920 in a manner similar to that illustrated in FIG. 7B.

In a case where a [NO] button is pressed in the pop-up screen 920, the screen 920 transitions to the home screen 940 in a manner similar to that illustrated in FIG. 7B.

In a case where a [YES] button is pressed in the pop-up screen 920, the screen 920 transitions to the shortcut selection screen 930. In the shortcut selection screen 930, a list of shortcuts associated with the account number of the account corresponding to the changed ID is displayed. The user selects a shortcut to be used after an update of the account information, from the displayed shortcut list. After selecting the shortcut for reflection, the user presses the [OK] button 936.

In a case where the shortcut selected in the shortcut selection screen 930 is a shortcut including registration of a folder path in setting contents, the screen 930 transitions to a transmission folder setting screen 1100.

In the transmission folder setting screen 1100, when a [Transmission Destination Folder] button 1101 is pressed, a screen (not illustrated) on which a transmission destination folder can be input appears, and after the user edits the transmission destination folder, the transmission folder setting screen 1100 appears again. Then, when a [Save Shortcut] button is pressed by the user, the screen 1100 transitions to the home screen 950 in which a shortcut icon not selected is deleted. For example, in FIG. 9B, the icon of [User A Shortcut] selected in the shortcut selection screen 930 is displayed, but the icon of [User A-2 Shortcut] is deleted and not displayed.

(3-6) Procedure for Account Change Processing

Figure 10:
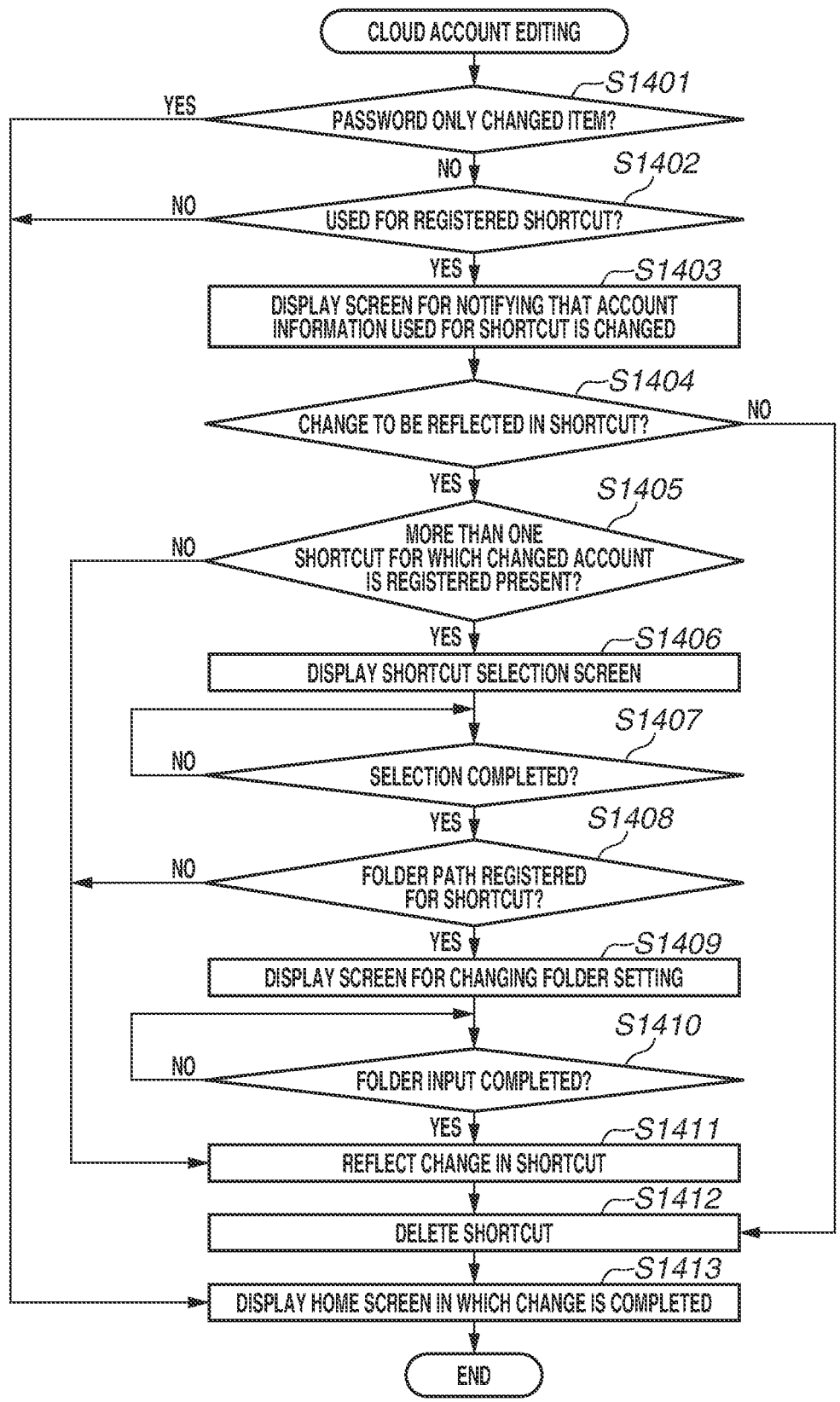
FIG. 10 illustrates a processing procedure for account change according to the second exemplary embodiment.

FIG. 10 illustrates an example of processing procedure for the account change of the MFP 101 according to the second exemplary embodiment. The CPU 111 loads a control program stored in the ROM 112 or the storage 114 into the RAM 113, so that each operation (step) of the MFP 101 in the flowchart of the present exemplary embodiment is executed. Step S1402 to step S1407 and step S1411 to step S1413 are similar to those in the first exemplary embodiment, and thus the description thereof will be omitted.

In step S1401, the CPU 111 determines whether the password is the only changed item in the account change screen 910 displayed on the operation unit 116. If the CPU 111 determines that the password is the only changed item (YES in step S1401), the processing proceeds to step S1413. If the password is not the only changed item (NO in step S1401), the processing proceeds to step S1402.

In step S1407, the CPU 111 determines whether the [OK] button 936 is pressed after the shortcut is selected in the shortcut selection screen 930 (YES in step S1407), and the processing proceeds to step S1408.

In step S1408, the CPU 111 determines whether a folder path is registered in the setting contents registered to the shortcut. If the CPU 111 determines that the folder path is registered thereto (YES in step S1408), the processing proceeds to step S1409. If the folder path is not registered thereto (NO in step S1408), the processing proceeds to step S1411.

In step S1409, the CPU 111 displays the transmission folder setting screen 1100 to change the folder setting. The user makes a setting in the screen (not illustrated) on which a transmission destination folder can be input displayed at a press of the [Transmission Destination Folder] button 1101, and subsequently, the screen 1100 appears again.

In step S1410, the CPU 111 determines whether the input of the folder is completed, and if the CPU 111 determines that the input of the folder is completed (YES in step S1410), the processing proceeds to step S1411.

As described above, in the present exemplary embodiment, the pop-up screen is displayed when necessary, and in the case of the transmission to the cloud (Scan to Cloud), the screen for changing the transmission destination folder is displayed, so that wrong transmission in the shortcut execution can be prevented.

In a third exemplary embodiment, in a case where a cloud account associated with a shortcut is deleted, deletion thereof is notified by display of a pop-up screen in the execution of the shortcut, so that wrong transmission is prevented.

(3-7) Screen in Account Deletion

Figure 11B:
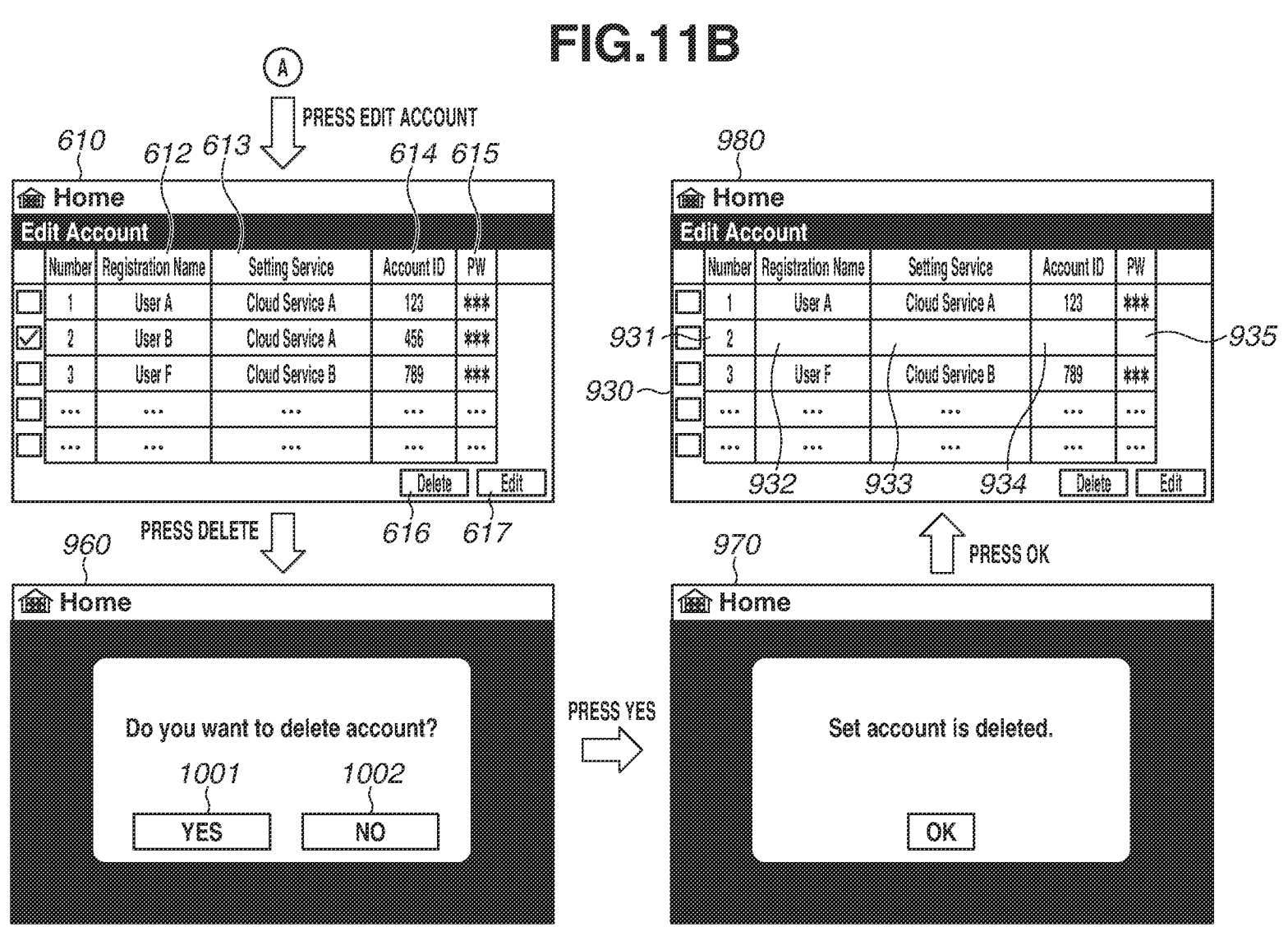

FIGS. 11A and 11bB illustrate an example of an error screen generation procedure for the shortcut execution.

When a cloud account setting icon 705 is pressed in the home screen 700, the screen 700 transitions to the cloud account setting screen 600, specifically, a screen for selecting whether to create or edit an account appears.

When the [Edit Account] button 602 is pressed, the screen 600 transitions to the screen 610 in which a list of cloud accounts that can be registered in the MFP 101 appears. The record of an account to be deleted/edited is selected by checking a checkbox at the top of the record.

Subsequently, when the [Delete] button 616 is pressed, the screen 610 transitions to a confirmation screen 960 for confirming deletion of the selected account. When a [YES] button 1001 is pressed, the deletion of the account is executed, and the screen 960 transitions to a screen 970. When the deletion of the account is completed, information in each of fields 932, 933, 934, and 935 of the record corresponding to the account number 2 is deleted from the account list and cannot be confirmed, as illustrated in a screen 980.

When the shortcut icon 702 is pressed in the home screen 700 in such a state where the account is deleted, the screen 700 transitions to an error screen 1300 notifying that the cloud service cannot be executed because the relevant cloud account is not present. Here, a message for prompting the user to re-register the account is displayed.

(Shortcut Management Table)

Figure 12:
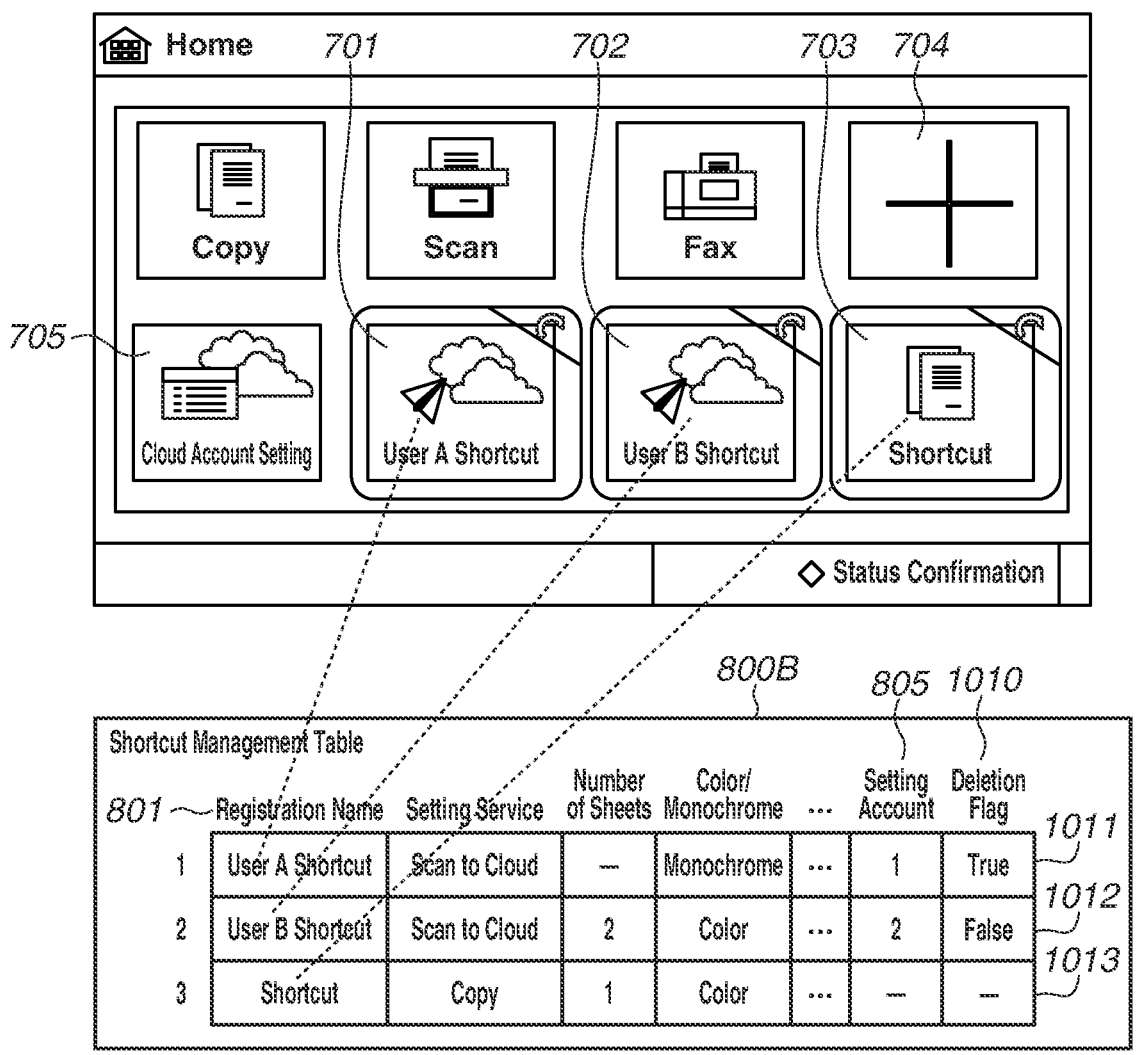
FIG. 12 illustrates a shortcut management table according to the third exemplary embodiment.

FIG. 12 illustrates an example of a shortcut management table according to a third exemplary embodiment. In the third exemplary embodiment, a column 1010 (deletion flag) is provided in a shortcut management table 800B as record deletion information.

If the deletion flag is "True" as in a field 1011 of the first record, it indicates that the account is deleted. If the deletion flag is "False" as in a field 1012 of the second record, it indicates that the account is not deleted. No deletion flag serving as the deletion information is set for a record irrelevant to the cloud service, as in a field 1013 of the third record.

(3-8) Shortcut Execution Operation Procedure for Account Deletion

Figure 13A:
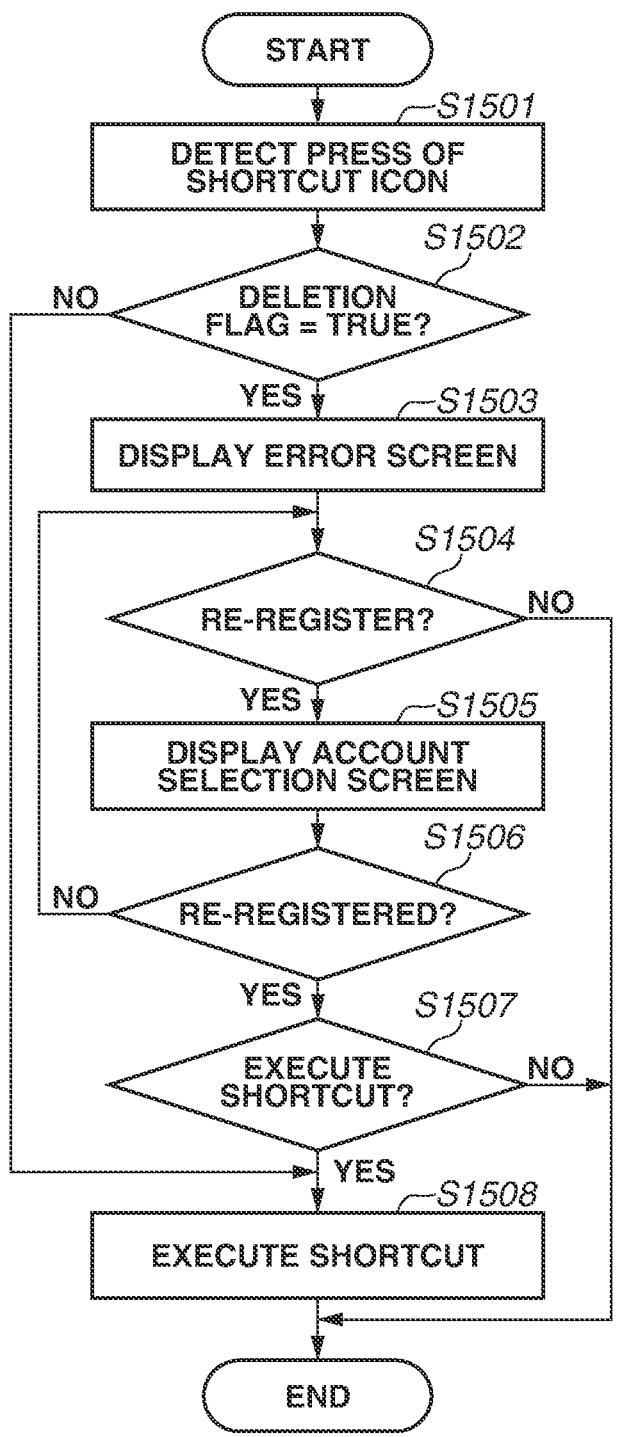
FIGS. 13A and 13B each illustrate a processing procedure for account deletion according to the third exemplary embodiment.

FIG. 13A illustrates an internal procedure for the shortcut execution in the cloud account deletion, and the procedure will be described below with reference to FIG. 12. The CPU 111 loads a control program stored in the ROM 112 or the storage 114 into the RAM 113, so that each operation (step) of the MFP 101 in the flowchart of the present exemplary embodiment is executed.

In step S1501, the CPU 111 detects a press of the shortcut icon 702 in the home screen 700 via the operation unit 116.

In step S1502, the CPU 111 refers to the column 1010 (deletion flag) in the shortcut management table 800B, and determines whether a cloud account associated with the shortcut icon 702 is deleted based on the value of the deletion flag. If the CPU 111 determines that the shortcut of the shortcut icon 702 is a shortcut not using the cloud account or a shortcut for which the cloud account is not deleted (the deletion flag is not determined or "False") (NO in step S1502), the processing proceeds to step S1508. Subsequently, in step S1508, the MFP function is executed based on the shortcut. If the CPU 111 determines that the shortcut is a shortcut for which the cloud account is deleted (the deletion flag is "True") (YES in step S1502), the processing proceeds to step S1503.

In step S1503, the CPU 111 instructs the operation unit 116 to display the error screen 1300.

In step S1504, the CPU 111 confirms whether the user wants to re-register the account, by acquiring a state of the press of the [YES] button or [NO] button in the error screen 1300, via the operation unit 116. If the account is not to be re-registered (NO in step S1504), the processing procedure ends without executing the shortcut.

If the [YES] button for the re-registration is pressed (YES in step S1504), the processing proceeds to step S1505.

In step S1505, the CPU 111 displays the account selection screen 750 (FIG. 4A) to prompt the user to select an account.

In step S1506, the CPU 111 determines whether the re-registration is performed. If the re-registration is not performed (NO in step S1506), the processing returns to step S1504 for reconfirmation. If the re-registration of the account is performed (YES in step S1506), the processing proceeds to step S1507.

In step S1507, the CPU 111 displays a screen (not illustrated) where the user can select whether to execute the shortcut. If the shortcut is to be executed (YES in step S1507), the processing proceeds to step S1508 to execute the shortcut. If the shortcut is not to be executed (NO in step S1507), the processing procedure ends.

Figure 13B:
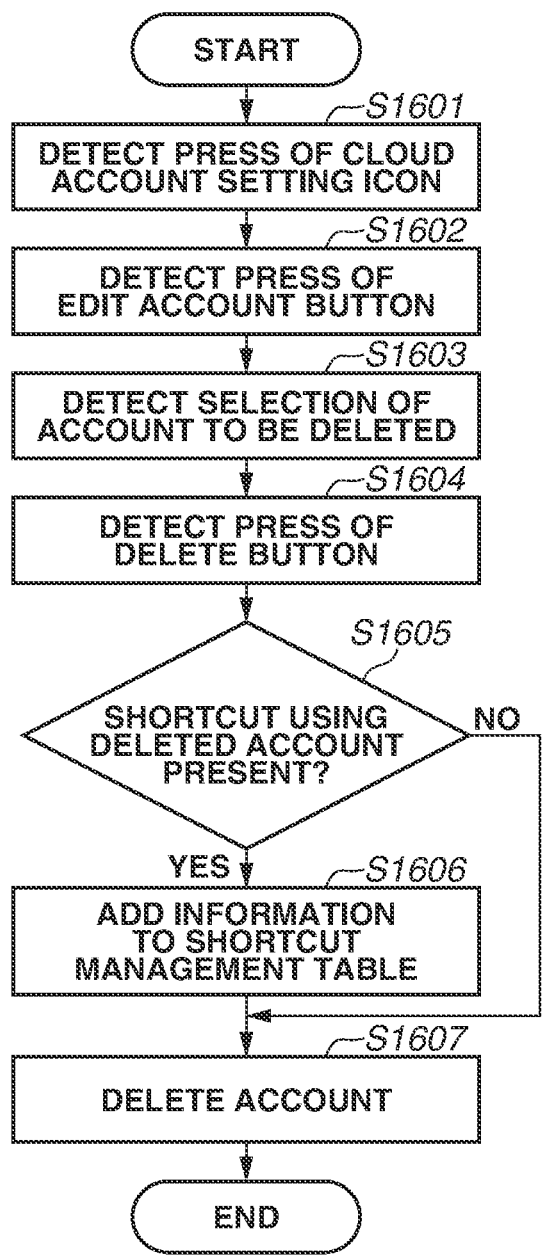

FIG. 13B illustrates an example of an internal procedure for account deletion.

In step S1601, the CPU 111 detects a press of the cloud account setting icon 705 and instructs the operation unit 116 to display the cloud account setting screen 600 (FIG. 11A).

In step S1602, the CPU 111 detects a press of the [Edit Account] button 602 in the cloud account setting screen 600, and the screen 600 transitions to the account editing screen 610.

In step S1603, the CPU 111 detects selection of an account to be deleted from a registered account list in the account editing screen 610.

In step S1604, the CPU 111 detects a press of the [Delete] button 616 in the account editing screen 610 via the operation unit 116, and displays the screen 960. The CPU 111 detects a press of the [YES] button 911 performed after the deletion of the account is confirmed.

In step S1605, the CPU 111 determines whether a shortcut using the account deleted in the account editing screen 610 is present, by searching for such a shortcut in an account management table. If the shortcut is present (YES in step S1605), the processing proceeds to step S1606. In step S1606, the CPU 111 adds information that the deletion flag is "True" to the shortcut management table 800B. If the shortcut is not present (NO in step S1605), the processing proceeds to step S1607.

In step S1607, the CPU 111 deletes the selected account.

In a fourth exemplary embodiment, there will be described an example in which an account change can be detected by using an identifier generated in the MFP 101 in a case where a cloud account is registered or changed.

Specifically, a column for an identifier corresponding to a cloud account is provided in a shortcut management table, so that a change of a cloud account associated with a shortcut is detected. Further, a screen for prompting the user to re-register the changed account to the shortcut is displayed, so that wrong transmission is prevented.

(Shortcut Management Table)

Figure 14:
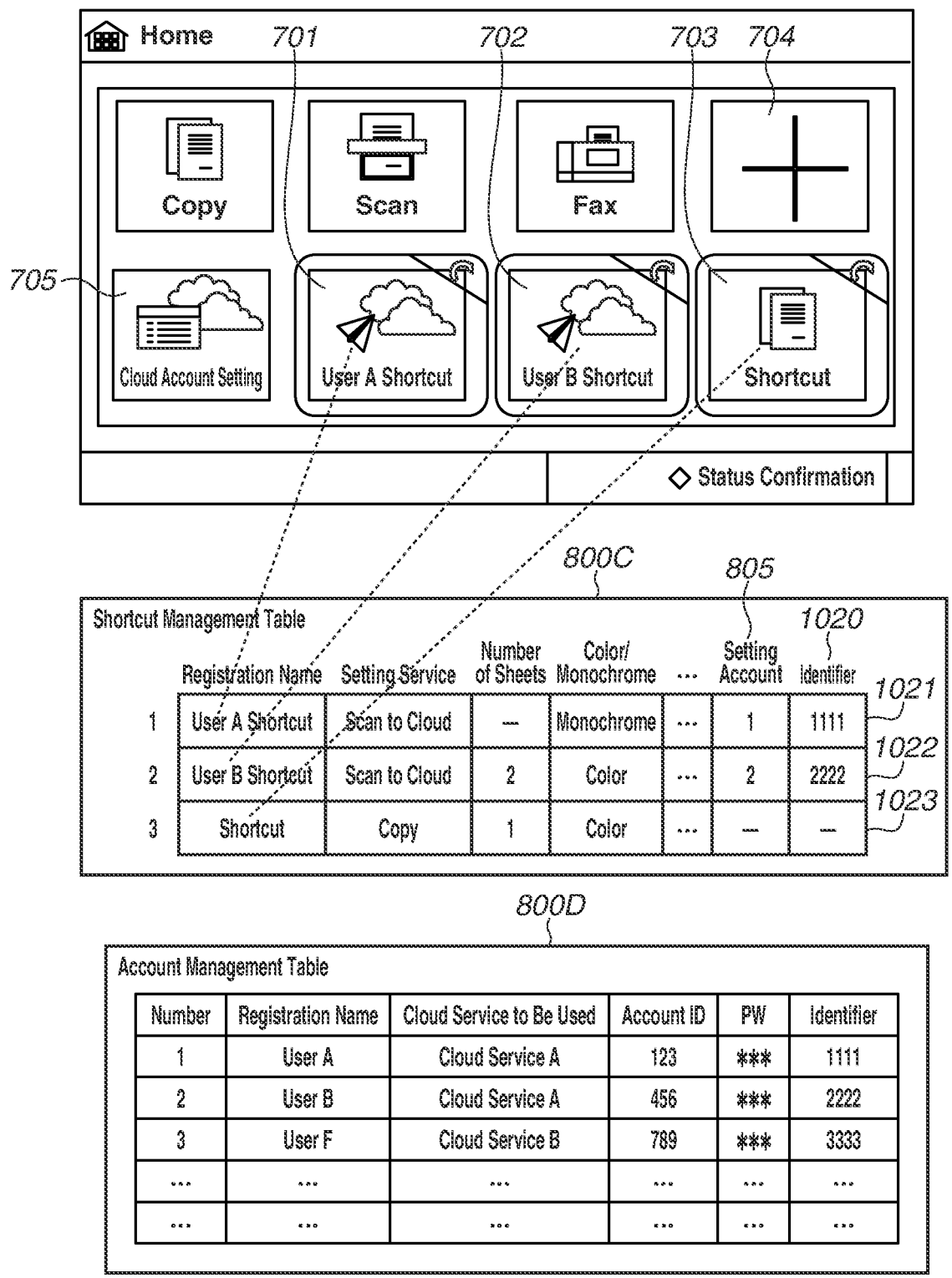
FIG. 14 illustrates a shortcut management table and an account management table according to a fourth exemplary embodiment.

FIG. 14 illustrates a shortcut management table 800C as an example of the shortcut management table according to the fourth exemplary embodiment. In the present exemplary embodiment, a column 1020 (identifier) is provided in the shortcut management table 800C.

The column 1020 (identifier) indicates data generated in the MFP 101 during account registration. The identifier may be a number or character, and have any length. The identifier may be any identifier as long as the identifier can be generated as a unique identifier based on a date and time of registration or the like. Alternatively, a hash value of the generated identifier may be used.

The addition of the identifier can coincide with step S1108 in the typical procedure for the account registration (FIG. 6A), and the identifier cannot be directly changed.

The identifier is similarly added to the shortcut management table 800C during shortcut creation. The addition of the identifier can coincide with step S1206 in the procedure for the shortcut creation (FIG. 6B). When an account is selected, an identifier added to an account management table 800D is referred to, and the same content is also added to the shortcut management table 800C.

FIG. 15 illustrates an example of an internal procedure for shortcut execution in account deletion.

In step S1701, the CPU 111 detects a press of the shortcut icon 702 by the user via the operation unit 116.

In step S1702, the CPU 111 determines whether the identifier added to the shortcut management table 800C is present. If the CPU 111 determines that the added identifier is not present (NO in step S1702), the processing proceeds to step S1710. In step S1710, the MFP function based on the shortcut is executed. If the CPU 111 determines that the added identifier is present (YES in step S1702), the processing subsequently proceeds to step S1703.

In step S1703, the CPU 111 searches through the account management table 800D and refers to information about an account corresponding to the account management number in the shortcut management table 800C.

In step S1704, the CPU 111 compares the identifier of the account management table 800D and the identifier of the shortcut management table 800C, and determines whether values of the identifiers are different. If the values are different (YES in step S1704), the processing proceeds to step S1705. If the values are the same (NO in step S1704), the processing proceeds to step S1710. In step S1710, the MFP function based on the shortcut is executed.

In step S1705, the CPU 111 displays an error screen on the operation unit 116.

In step S1706, the CPU 111 determines whether to perform re-registration. If the re-registration is not to be performed (NO in step S1706), the procedure ends without executing the shortcut.

If the re-registration is to be performed (YES in step S1706), the processing proceeds to step S1707.

In step S1707, the CPU 111 causes the operation unit 116 to transition the displayed screen to the account selection screen to prompt the user to select an account.

In step S1708, the CPU 111 determines whether the selected account is re-registered.

If the account is not re-registered (NO in step S1708), the processing returns to step S1706 for reconfirmation.

If the account is re-registered (YES in step S1708), the processing proceeds to step S1709.

In step S1709, the CPU 111 displays a confirmation screen for selecting whether to execute the shortcut.

If the shortcut is to be executed (YES in step S1709), the processing proceeds to step S1710. If the shortcut is not to be executed (NO in step S1709), the procedure ends.

In step S1710, the CPU 111 executes the set MFP function, and the procedure ends.

Embodiments of the present disclosure can also be implemented by processing of supplying a program for implementing one or more functions according to the above-described exemplary embodiments to a system or apparatus via a network or a storage medium and causing one or more processors in a computer of the system or apparatus to read and execute the program. Embodiments of the present disclosure can also be implemented by a circuit that implements the one or more functions (for example, an application specific integrated circuit (ASIC)).

Wrong transmission in executing the shortcut using the cloud service can be prevented.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-207362, filed Dec. 15, 2020, which is hereby incorporated by reference herein in its entirety.

What is claimed is:

1. An information processing apparatus comprising:
a memory configured to store account information of a cloud service and setting information of a function regarding the cloud service, wherein the setting information is stored in association with the account information;
a display configured to display a shortcut for executing the function based on the stored setting information and the account information associated with the setting information; and
a controller configured to:
receive a user instruction for changing the stored account information; and notify, in a case that the setting information is stored in association with the account information designated by the received user instruction, a user of information regarding updating account information to be used based on a selection of the displayed shortcut.

2. The information processing apparatus according to claim 1, wherein the controller is further configured to:
cause the display to display the shortcut corresponding to the setting information that is stored in association with the account information designated by the received user instruction in a selectable manner; and
update the account information stored in association with the setting information in a case that the shortcut displayed in the selectable manner is selected by the user.

3. The information processing apparatus according to claim 2, wherein the controller is further configured to delete the setting information corresponding to the shortcut in a case that the shortcut displayed in the selectable manner is not selected by the user.

4. The information processing apparatus according to claim 1, wherein, in a case where a change of the account information is only a change of a password, the controller changes the account information associated with the setting information corresponding to the shortcut using the account information, without displaying the information.

5. The information processing apparatus according to claim 1, wherein the function corresponding to the shortcut is a function of transmitting data to the cloud service.

6. The information processing apparatus according to claim 5, wherein the data is generated by reading a document.

7. The information processing apparatus according to claim 1, wherein, in a case where the shortcut that is stored in association with the account information designated by the received user instruction is selected for executing the function based on the stored setting information, the controller causes the display to display a screen for notification.

8. The information processing apparatus according to claim 7, wherein the controller causes the display to display the notification in a case that account information corresponding to the shortcut is different from the account information registered when the setting information corresponding to the shortcut is registered.

9. The information processing apparatus according to claim 7, wherein the notification is notification regarding updating the account information corresponding to the shortcut.

10. The information processing apparatus according to claim 1, wherein the account information includes a user identifier and a password.

11. A method of controlling an information processing apparatus including a memory configured to store account information of a cloud service and setting information of a function regarding the cloud service, wherein the setting information is stored in association with the account information, and a display configured to display a shortcut for executing the function based on the stored setting information and the account information associated with the setting information, the method comprising:
receiving a user instruction for changing the stored account information; and
notifying, in a case that the setting information is stored in association with the account information designated by the received user instruction, a user of information regarding updating account information to be used based on a selection of the displayed shortcut.

12. The method according to claim 11, further comprising:
changing, in a case where a change of the account information is only a change of a password, the account information associated with the setting information corresponding to the shortcut using the account information, without displaying the information.

13. A non-transitory computer-readable storage medium storing a program causing an information processing apparatus including a memory configured to store account information of a cloud service and setting information of a function regarding the cloud service, wherein the setting information is stored in association with the account information, and a display configured to display a shortcut for executing the function based on the stored setting information and the account information associated with the setting information to execute a control method, the control method comprising:
receiving a user instruction for changing the stored account information; and
notifying, in a case that the setting information is stored in association with the account information designated by the received user instruction, a user of information regarding updating account information to be used based on a selection of the displayed shortcut.

14. The non-transitory computer-readable storage medium according to claim 13, the control method further comprising:
changing, in a case where a change of the account information is only a change of a password, the account information associated with the setting information corresponding to the shortcut using the account information, without displaying the information.

* * * * *